(12) United States Patent
Iriarte Lopez et al.

(10) Patent No.: US 11,613,986 B1
(45) Date of Patent: Mar. 28, 2023

(54) METHODS AND SYSTEMS FOR PROCESSING TIME-SERIES WELL DATA USING HIGHER ORDER CHANNELS TO IDENTIFY FEATURES THEREIN AND ALTER HYDRAULIC FRACTURING OPERATIONS BASED THEREON

(71) Applicant: Well Data Labs, Inc., Denver, CO (US)

(72) Inventors: Jessica G. Iriarte Lopez, Denver, CO (US); Alberto J. Ramirez Ramirez, Denver, CO (US); Samid A. Hoda, Thornton, CO (US)

(73) Assignee: Well Data Labs, Inc., Denver, CO (US)

( * ) Notice: Subject to any disclaimer, the term of this patent is extended or adjusted under 35 U.S.C. 154(b) by 184 days.

(21) Appl. No.: 16/951,946

(22) Filed: Nov. 18, 2020

Related U.S. Application Data

(63) Continuation-in-part of application No. 16/850,972, filed on Apr. 16, 2020.

(60) Provisional application No. 62/953,020, filed on Dec. 23, 2019, provisional application No. 62/937,068, filed on Nov. 18, 2019.

(51) Int. Cl.
*E21B 47/06* (2012.01)
*E21B 43/267* (2006.01)
*G01N 15/00* (2006.01)

(52) U.S. Cl.
CPC ............ *E21B 47/06* (2013.01); *E21B 43/267* (2013.01); *G01N 15/00* (2013.01)

(58) Field of Classification Search
CPC ......... E21B 47/06; E21B 43/267; G01L 11/00
See application file for complete search history.

(56) References Cited

U.S. PATENT DOCUMENTS

| | | | | |
|---|---|---|---|---|
| 11,193,367 B2* | 12/2021 | Jin | ........................... | E21B 47/06 |
| 11,299,980 B2* | 4/2022 | Felkl | ..................... | G01V 99/005 |
| 11,313,211 B2* | 4/2022 | Johnson | .................. | E21B 47/06 |

(Continued)

OTHER PUBLICATIONS

Jessica G. Iriarte Lopez et al., U.S. Appl. No. 16/850,972, filed Apr. 16, 2020.

*Primary Examiner* — Nguyen Q. Ha
(74) *Attorney, Agent, or Firm* — Polsinelli PC; Gregory P. Durbin

(57) ABSTRACT

A method for identifying characteristics of well data comprises receiving hydraulic fracturing data comprising data channels from a stage or stages of a hydraulic fracturing sequence and preprocessing the data channel, which may include normalizing and recalibrating the hydraulic fracturing data. The method further involves generating one or more additional higher order channels based on the normalized and recalibrated hydraulic fracturing data, the one or more additional channels derived at least in part from parameters of the normalized and recalibrated hydraulic fracturing data. The system may combine the higher order channels with the accessed data channels, and further process, combine and otherwise identify hydraulic fracturing events at the well being hydraulically fractured based on the received hydraulic fracturing data and the one or more additional channels. From the identified events, the system may alter hydraulically fracturing attributes of a stage being completed and/or subsequent stages of the well or subsequent wells.

13 Claims, 18 Drawing Sheets

(56) References Cited

U.S. PATENT DOCUMENTS 11,365,617 B1\* 6/2022 Haustveit ................ E21B 47/06
2022/0282611 A1\* 9/2022 Quan .................... E21B 47/117

\* cited by examiner

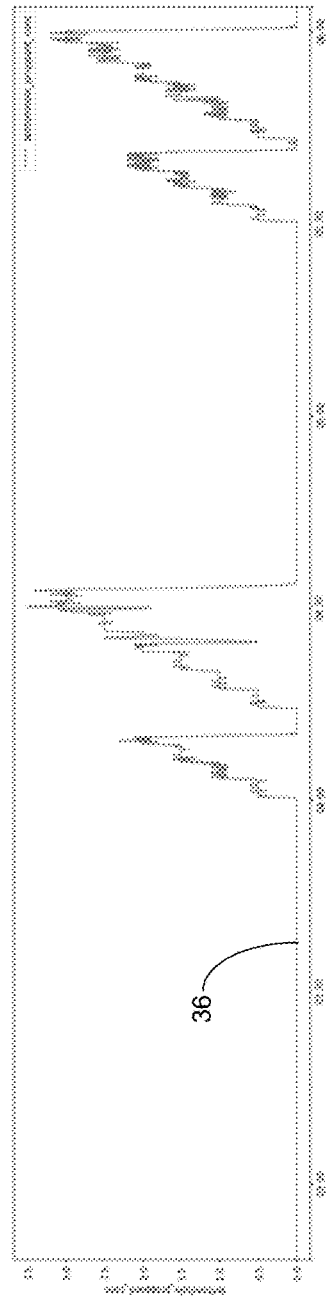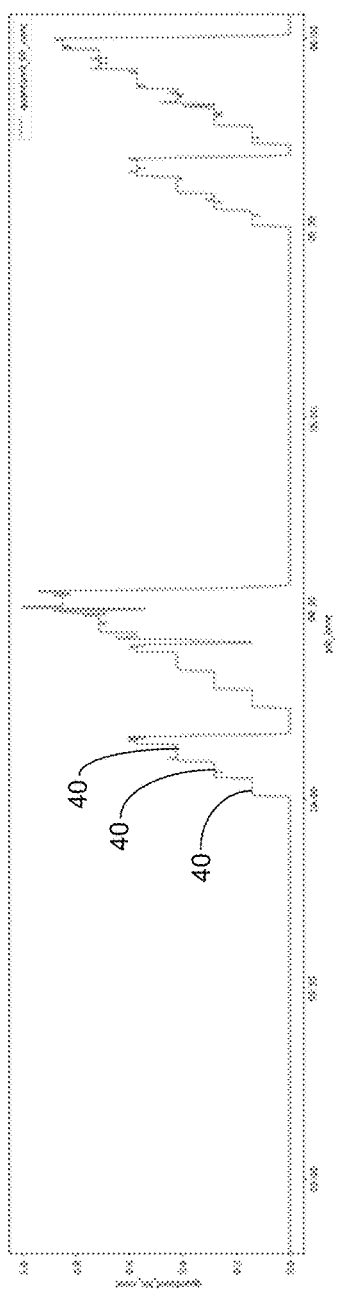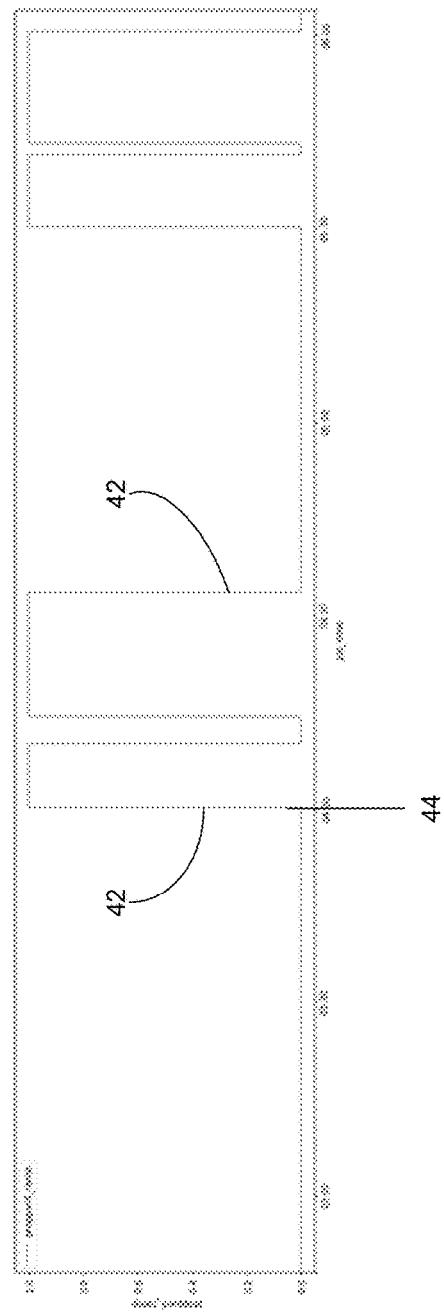

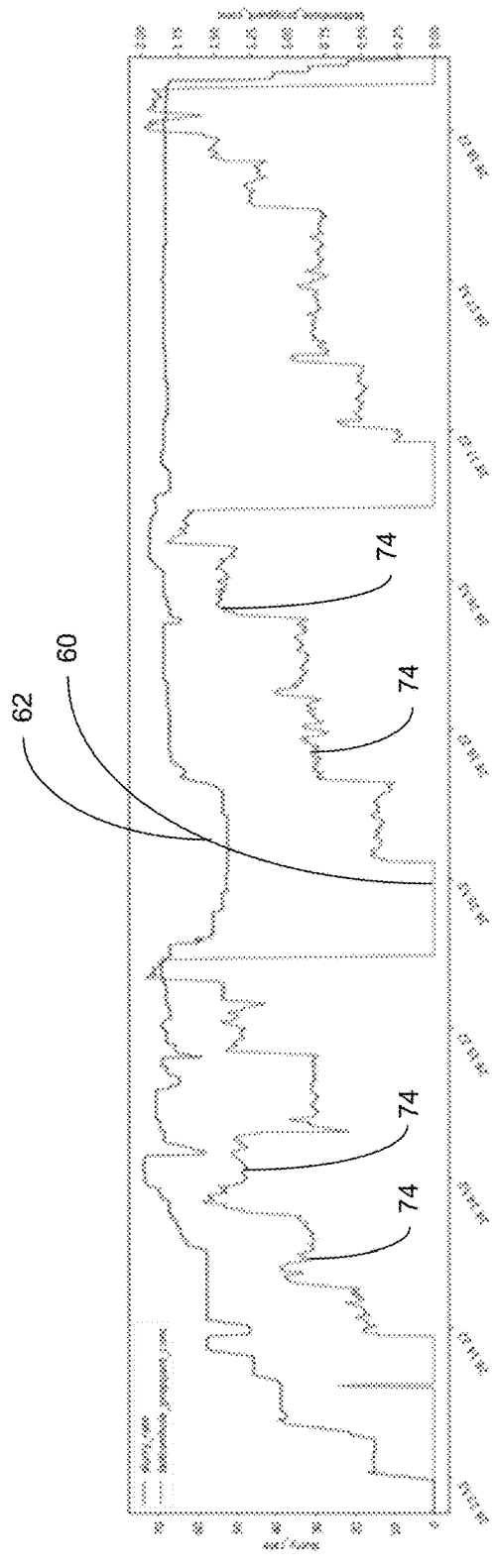
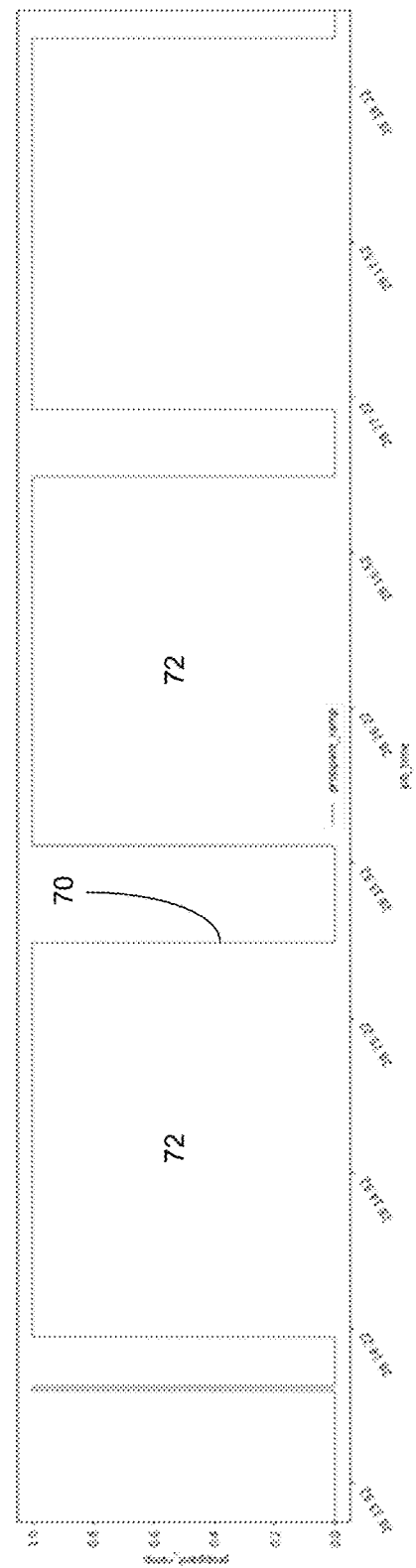

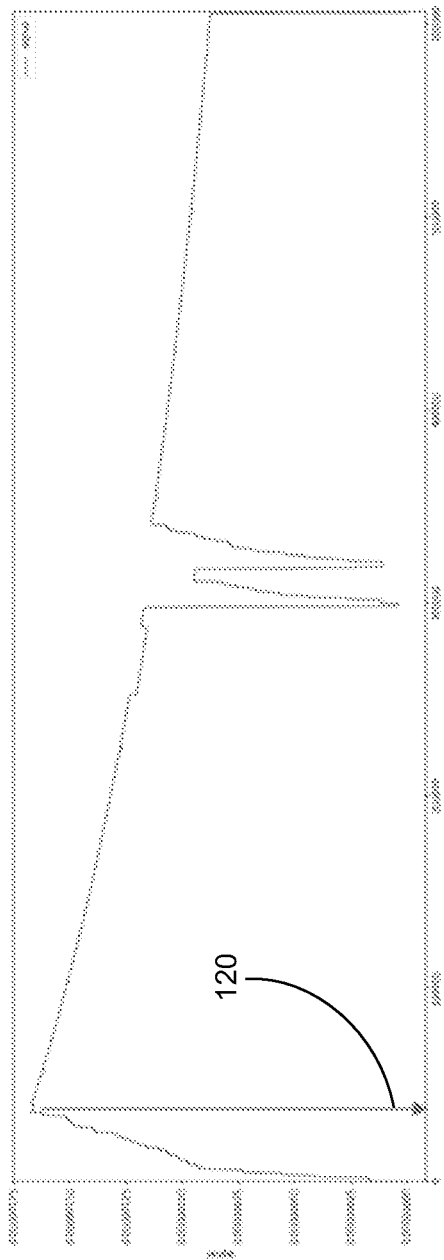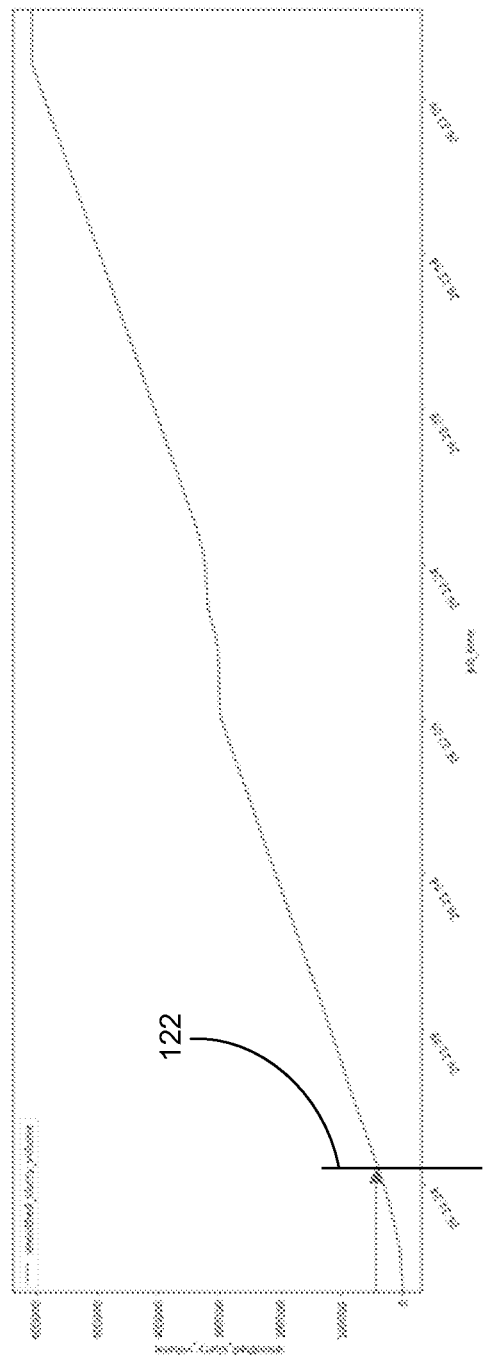
FIG. 12(A)
FIG. 12(B)

Same volume over different lengths in time (x-axis) due to the changing slurry rate Same lengths (now volumes) when comparing concentrations using slurry volume as x-axis

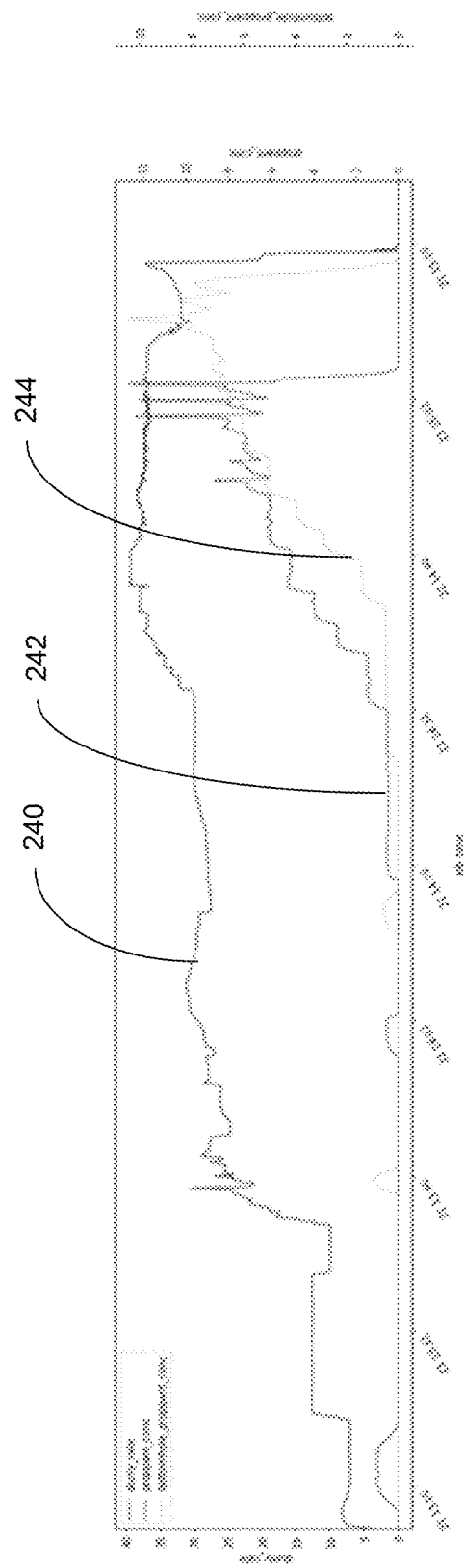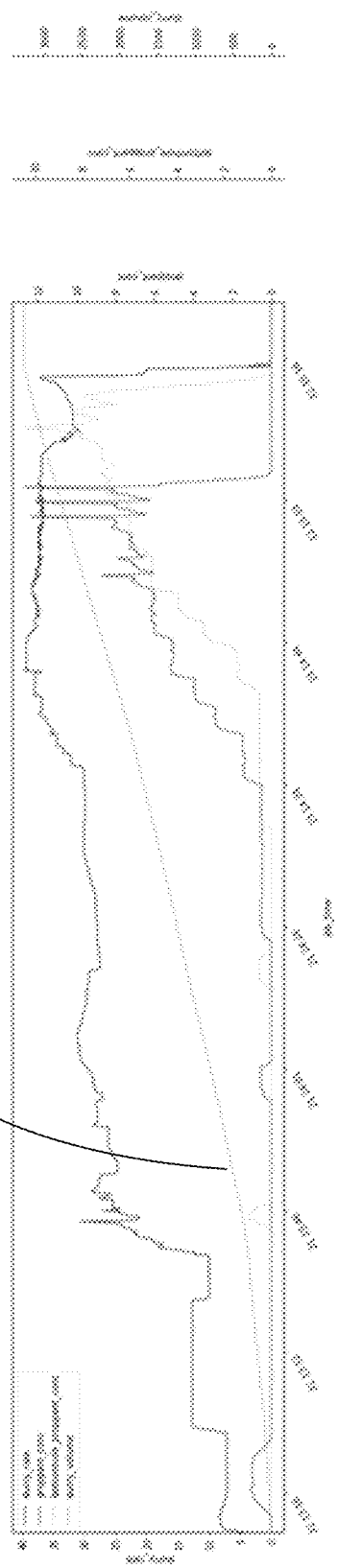
FIG. 14(A)
FIG. 14(B)

METHODS AND SYSTEMS FOR PROCESSING TIME-SERIES WELL DATA USING HIGHER ORDER CHANNELS TO IDENTIFY FEATURES THEREIN AND ALTER HYDRAULIC FRACTURING OPERATIONS BASED THEREON

CROSS-REFERENCE TO RELATED APPLICATIONS

This application is related to and claims priority under 35 U.S.C. § 119(e) from U.S. Patent Application No. 62/937,068 filed Nov. 18, 2019 entitled "METHODS AND SYSTEMS FOR PROCESSING TIME-SERIES DATA USING HIGHER ORDER CHANNELS" and U.S. Patent Application No. 62/953,020 filed Dec. 23, 2019 entitled "METHODS AND SYSTEMS FOR PROCESSING TIME-SERIES DATA USING HIGHER ORDER CHANNELS," both of which are hereby incorporated by referenced in their entirety. This application is also a continuation-in-part claiming priority to co-pending application Ser. No. 16/850,972 titled "METHODS AND SYSTEMS FOR PROCESSING TIME-SERIES DATA USING HIGHER ORDER CHANNELS TO IDENTIFY EVENTS ASSOCIATED WITH DRILLING, COMPLETION AND/OR FRACTURING OPERATIONS AND ALTER DRILLING, COMPLETION AND/OR FRACTURING OPERATIONS BASED THEREON" filed Apr. 16, 2020, which is hereby incorporated by reference herein.

TECHNICAL FIELD

Aspects of the present disclosure involve analysis of time sequenced fracture data to automatically identify characteristics of the fracture data based on channels generated from the fracture data.

BACKGROUND

Time-series data is often used in various domains of the oil and gas industry to collect information about drilling and completion operations, including hydraulic fracturing, among other things. Generally, time-series data includes logs and/or streaming data from various sensors dispersed throughout a well site including on surface equipment and downhole equipment. The time-series data is used to identify events, respond to events, plan drilling, treatment, and hydraulic fracturing strategies, and perform numerous other important aspects from drilling the well to managing production from the well (or wells).

However, time-series data is often treated inconsistently and/or processed through manual analysis. Manual processing can only discern relatively obvious features of the time-series data and is limited to the channels native to the time-series data without significant time and energy investment in further processing. As a result, accuracy and speed of the analyses cannot take into consideration hidden features, such as higher order or derived data channels, and so are reduced as a consequence.

It is with these observations in mind, among others, that aspects of the present disclosure were conceived.

SUMMARY

Aspects of the present disclosure involves computer implemented methods, processing systems and computer executable instructions set forth on a non-transitory computer readable medium. Various aspects involve obtaining well data, which may be time series data, from various sensors associated with drilling operations, and completion and hydraulic fracturing operations. The sensors and data may be obtained from downhole equipment such as measurement while drilling sensors, sensors along the well bore, sensors positioned within stage, and from sensors and equipment above ground such as associated with pump trucks and the like.

In one example, a method for identifying characteristics of well data comprises receiving hydraulic fracturing data comprising multiple data channels from a stage or stages of a hydraulic fracturing sequence and preprocessing the data channel, which may include normalizing and recalibrating the hydraulic fracturing data. The method further involves generating one or more additional channels based on the normalized and recalibrated hydraulic fracturing data, the one or more additional channels derived at least in part from parameters of the normalized and recalibrated hydraulic fracturing data and identifying hydraulic fracturing events based on the received hydraulic fracturing data and the one or more additional channels.

In another example, aspects of the present disclosure involve a non-transitory computer readable medium comprising computer executable instructions what, when executed by a processor, perform the following: access a bottomhole proppant data channel comprising a series of bottomhole proppant concentration values for a stage being hydraulically fractured; normalize the bottomhole proppant concentration channel; quantize the normalized bottomhole proppant concentration channel to generate a proppant ramp channel denoting at least one time period encompassing at least one proppant ramp where the quantized bottomhole proppant concentration channel meets a first threshold value, the denoted at least one time period representing the at least one proppant ramp.

In another example, aspects of the present disclosure involve a non-transitory computer readable medium comprising computer executable instructions that, when executed by a processor, perform the following: receive hydraulic fracturing data comprising at least one data channel for at least one stage of a hydraulic fracturing sequence, the hydraulic fracturing data being a slurry rate for a stage being hydraulically fractured; preprocess the at least one data channel; generate one or more additional channels based on the preprocessed hydraulic fracturing data, the at least one additional channel being a slurry volume channel for the stage being hydraulically fractured; and identify a hydraulic fracturing event based on the received hydraulic fracturing data and the one or more additional channels, the hydraulic fracturing event being a target slurry rate.

These and other aspects of the present disclosure are discussed further below.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters may refer to the same parts or similar throughout the different views. It is intended that the embodiments and figures disclosed herein are to be considered illustrative rather than limiting.

FIG. 4(A) is a plot of time series data for hydraulically fracturing a well, the time series data including bottomhole proppant concentration and identifying sets of proppant ramps;

FIG. 4(B) is a plot of the time series data of FIG. 4A after preprocessing;

FIG. 4(C) is a plot of a derived higher order proppant ramp channel identifying periods of time where one or proppant ramps are present in the data of FIGS. 4A and 4B in accordance with embodiments hereof;

FIG. 7(A) is a plot of time series data for hydraulically fracturing a well, the time series data including bottomhole proppant concentration and slurry rate, and illustrating proppant ramps;

FIG. 7(B) is a plot of a higher order derived proppant ramp channel for the data of FIG. 7(A) in accordance with an embodiment hereof;

FIG. 12(A) is a plot of processed slurry rate with a target slurry volume identified;

FIG. 12(B) is a plot of the slurry volume channel with a time of the target rate reached;

FIG. 14(A) is a time series plot like FIG. 13(A);

FIG. 14(B) is a time series plot like FIG. 13(A) and including a derived slurry volume channel;

DETAILED DESCRIPTION

Figure 1:
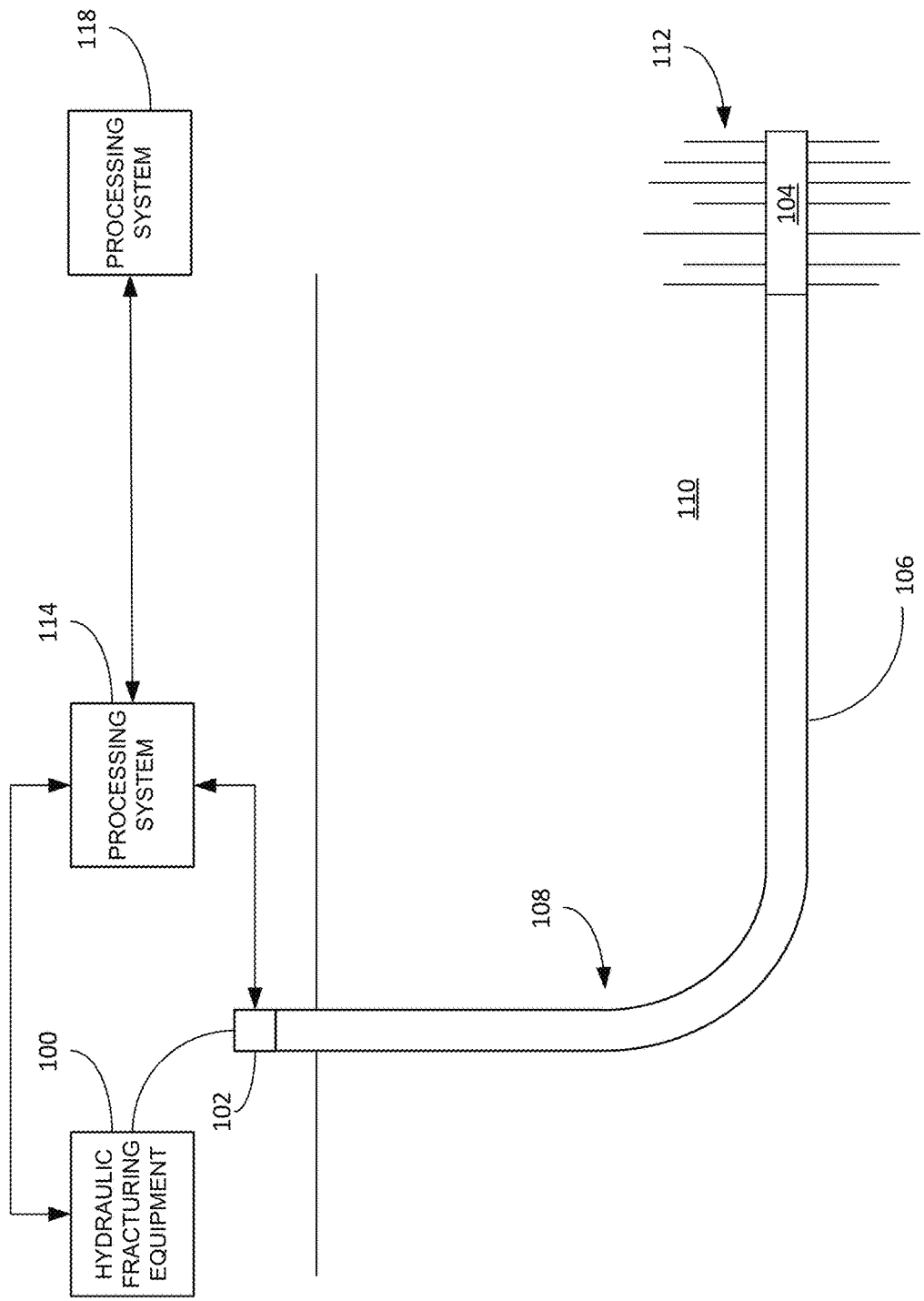
FIG. 1 is a system diagram illustrating a processing system coupled with a hydraulic fracturing system coupled with a well to hydraulic fracture a stage of the well, with the processing system to collect well processing data and process the same, according to one embodiment of the present application.

Aspects of the present disclosure involve a method and system for generating data channels from time-series data, where the generated channels are in addition to those data channels already native to the time-series data. For example, generated channels, which may be higher order channels, such as channels based on a derivative of the data in a channel, processed through a particular mapping function, computation and being some form of combination of channels, or the like, may be generated from an initial time-series data input or inputs. The system further generates and identifies various possible features of interest reflective of some form of real well completion process, and from which then may be acted on. Various embodiments are discussed and the derived channels and identified features may be used to provide data visualizations, such as through a graphical user interface (GUI), for review, or for downstream processes such as for training models or input into trained models or the like for further processing and analysis. The generated channels along with the identified features, alone or in combination with the time series data, may be used to plan and alter any number of possible well related activities.

In modern hydraulic fracturing processes and other well drilling, completion and related processes, the various devices and sensors associated with such processes are streaming (continuously generating and transmitting) high-frequency data to equipment in the field and from the field to remote locations for monitoring, storage, and analysis. Analyzing this data is challenging and can be especially challenging when attempting to identify various real-world events from the data given the volume of data, the disparate characteristics of the data that may appear related to the event of interest, data noise, duplications in the data, missing data, and various other challenges. The recorded data can include numerous channels, sometimes in the hundreds, each collecting data points, often every second, related to operations involved in completing a well including operations associated with hydraulically fracturing a well. In hydraulic fracturing, a stage refers to a discrete section of a horizontal portion of a well, typically separated from other parts of the well by packers. Hydraulic fracturing involves pumping fluid under relatively high pressure into the stage where the fluid flows through perforations into the formation surrounding the well to fracture the formation and allow hydrocarbons to then flow into the well and to the surface.

One or more aspects of the present disclosure are directed to cloud based applications utilizing machine learning processes, to generate and derive various new data channels using the data channels from the field, and automatically and quickly detect or otherwise identify numerous possible events from the data, which events may be correlated with real-world events and/or used to control various well related operations. The various events that may be identified, based on using higher order and otherwise derived or generated channels of data include: detecting proppant ramps in a stage; detecting when acid has reached perforations; detecting and identifying a target slurry rate; estimating flush volume; and detecting proppant values and presence at perforations. The methods discussed herein are useful in real-time and in the context of a cloud system are equally applicable to data collected and processed in the field or remotely.

Real-time collection and analysis of field data provides the ability to react quickly to new information about any underlying formation's response to a treatment. The ability to react quickly can provide improved operational performance, e.g., decreased operations time, better use of materials, reduced costs, etc. Similar benefits are achievable when analyzing the data in a less than real-time context in that operations can be altered in the same or subsequent stages.

A cloud based platform of the present disclosure with a web-based analysis tool provides a central repository and consistent interface that utilizes machine learning models for preprocessing (e.g., cleaning, de-noising, re-sequencing, and evaluating for quality control) incoming data and analyzing multiple channels such as slurry rate, proppant concentration and bottomhole proppant concentration, and treating pressure channels, and deriving channels from the same or otherwise.

The disclosure begins with an overview of an on-site hydraulic fracturing setting. FIG. 1 illustrates an example on-site setting for performing a hydraulic fracturing process, according to an aspect of the present disclosure. The system diagram is representative of a hydraulic fracture system 100 operably coupled with a well head 102, and set up to hydraulically fracture stages 104 of a horizontal section 106 of a wellbore 108. The hydraulic fracturing equipment may include pump trucks, sources of water (e.g., water trucks), and sources of proppant, diverter, acid and other substances that may be combined with water and injected into the well as part of the hydraulic fracturing process. In some configurations, a pump truck is connected to the well head 102 to pump, under controlled pressure and rate, the hydraulic fracturing fluid into the well. The fracturing fluid flows through a well casing (not shown) to the stage 104 being hydraulic fractured. The casing of the stage has been perforated such that fluid pumped into the stage can flow through the perforations to open fractures 112 in the formation 110 surrounding the well. For illustration, only one stage is shown at the toe of the well; however, a horizontal section typically has numerous stages as a horizontal section of a well may be thousands of feet, and stages are discrete sections around one hundred feet. The well and the equipment involved in the hydraulic fracturing process may include sensors, gauges, and other devices to monitor and record data associated with the hydraulic fracturing processes. The data may then be reported and stored at a processing system 114. The processing system 114 may involve one or more computing devices, at the well site. The processing system 114 may be in wired or wireless communication with various aspects of the well and/or the fracturing equipment.

Processing system 114 may be communicatively coupled to an off-site (remote) processing center 118. As will be described below, remote processing center 118 may receive streams of data from processing system 114 to perform processing of the received data, in real-time or otherwise. Processing center may include a data store from which various data channels may be stored and retrieved for analysis. Various sensors installed at a well, as well as sensors associated with the various equipment, monitor statistics and data, as described above for each stage of fracturing of each well. Such data is then transmitted, using any known or to be developed method, from on-site processing systems such as processing system 114 to remote processing center 118 for analysis, as will be described below. Remote processing center 118 may also be referred to as remote processor 118 and/or controller 118.

Figure 2:
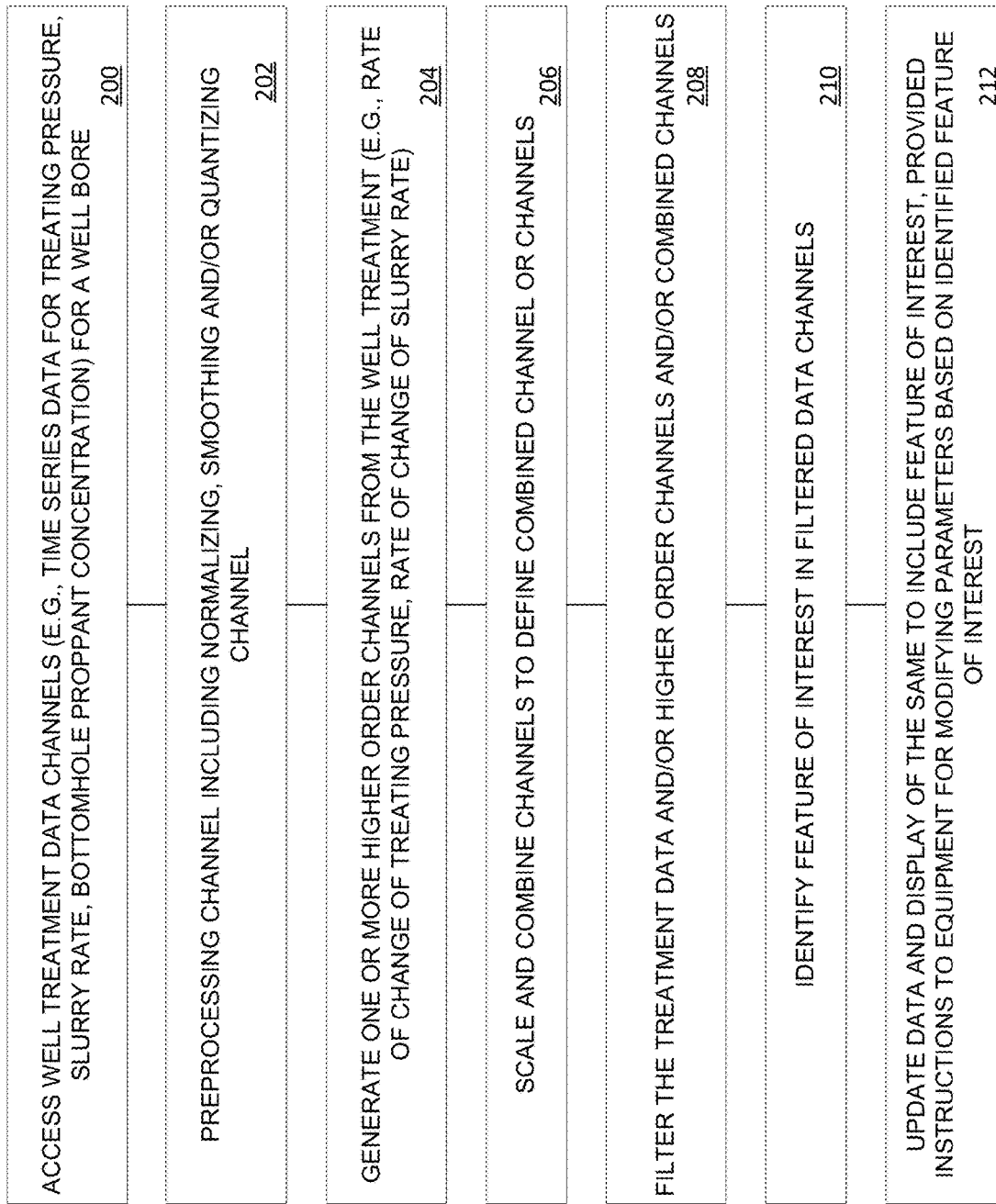
FIG. 2 is a flowchart illustrating one method of processing and acting on well treatment data according to one embodiment of the present application.

FIG. 2 is a flow diagram illustrating operations involved in various embodiments of the present disclosure. In various embodiments, operations may be rearranged, operations may not be performed etc. Additionally, various embodiments may perform operations differently or add operations as discussed herein. Moreover, each operation referenced in FIG. 2 may involve a sequence of operations depending on the embodiment and as discussed below. Referring to FIG. 2, the method involves accessing treatment data (200). In the various embodiments discussed herein, treatment and related data is accessed from various possible sources including as streams and otherwise as discussed relative to FIG. 1. The method of FIG. 2 may be used, in general, to process various forms of data to generate different types of information, which may then be used in various ways related to drilling and completing a well.

A. Identifying Proppant Ramps and Related Information

In one example, the system may automatically identify proppant ramps and generate statistics for the ramps by generating a new channel based on historical data and/or live sensor data from downhole sensors. In particular, the system may detect and automate the identification of proppant ramps (e.g., bottomhole increases in proppant concentration) using time series data of bottomhole proppant concentration as initial channels. The system accesses the bottomhole proppant concentration time series data (operation 200) from the sources as discussed relative to FIG. 1. In many instances, the accessed data streams provide series of data values in whatever form is appropriate for the channel—e.g., psi (pounds per square inch) for treating pressure—and the data is provided along a time scale—e.g., hour:min:sec or min:sec or job time. One of ordinary skill will recognize the proper units of measurement for the various described channels. For the identified proppant ramps, the system may collect and/or generate additional data and statistics for the same.

During hydraulic fracturing, proppant, such as sand, is often pumped into a well (typically mixed with the fracturing fluid) such that the proppant is carried into the fractures as they form. The proppant is used to hold the fractures open after the hydraulic fracturing is complete. In general, the system automates the identification of proppant ramps (increases in bottomhole proppant concentration), which correlate when proppant reaches perforations in the stage being completed. The system may also gather additional information for the time at which the proppant ramp is identified, all of which is useful in the design of completions for subsequent stages in the same or other wells, as well as real-time control over fracturing operation of the current stage.

Figure 3:
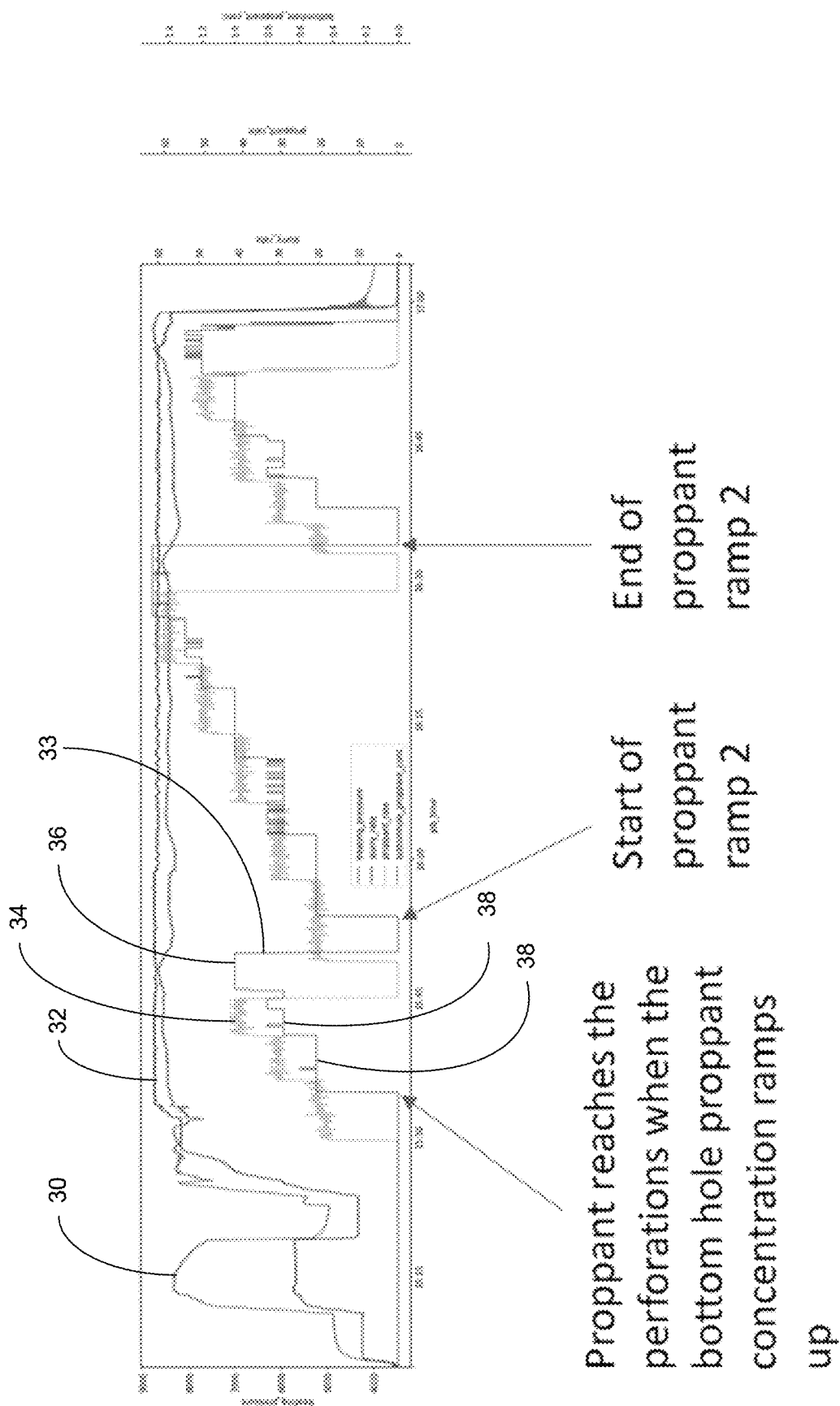
FIG. 3 is a plot of time series well data for hydraulically fracturing a well, the time series data including treating pressure, slurry rate, proppant rate and bottomhole proppant concentration.

FIG. 3 illustrates a multiple channel plot of treating pressure (PSI) 30, slurry rate (BPM) 32, proppant rate 34 (or alternatively surface proppant concentration) and bottomhole proppant concentration 36. It can be seen that there are steps in the proppant rate that precede associated steps in the bottomhole proppant concentration. The bottomhole proppant concentration value ramps up when the proppant, associated with the preceding proppant rate increase, reaches the perforations in whatever stage is being hydraulically fractured. A ramp typically involves a sequence of discrete proppant steps 38, and is generally a period of elevated bottomhole proppant concentration.

In general, the technique by which the system identifies proppant ramps begins with preprocessing the channel which may include normalizing the data of the initial channels, or the treatment data upon which they are based. Preprocessing may also include smoothing and quantizing the channel data. The channel is then recalibrated and a proppant ramp channel is generated which identifies points that most likely belong to a proppant ramp. The new proppant ramp channel is added to the treatment data. A list of potential proppant ramp intervals (e.g., start and end job time pairings) is generated based on the original and new channels. From the list, potential proppant ramps are identified that are likely to be actual proppant ramps based on respective ramp durations (e.g., an elevated bottomhole proppant concentration following the ramp that is more than 600 seconds, etc.). As a result, useful statistics (e.g., various data associated with a ramp) can be determined for each proppant ramp for downstream processing and the like. For example, and without imputing limitation, duration, average treating pressure, average slurry rate, and average bottomhole proppant concentration can be calculated for each proppant ramp.

To preprocess the channel (operation 202), the system first isolates the bottomhole proppant concentration channel. The system then processes the isolated channel and rearranges, if necessary, the data such that it is in chronological order. In one example, the bottom hole proppant concentration values are arranged with job time, date:hour:second or some other chronological identifier. The system removes any data value, e.g., a time value row in the data table, with a missing bottomhole proppant concentration value.

Due to various sensor value reading anomalies, noise, etc., some bottomhole proppant concentration values may be negative. The system recalibrates such values by clipping (altering) any negative bottomhole proppant concentrations to be zero and/or vertically shifting the channel to ensure the minimum value is zero. So, for example, if the minimum value is some positive value greater than zero, the channel is shifted down by the magnitude of the minimum value such that the minimum value is zero.

The system then further processes the channel. In one example, the system smooths the channel with a centered short window robust smoother $S_1$ (e.g., centered 11 second median smoother). The smoothed channel is normalized to range from zero to one and quantized in Q evenly space discrete steps via, in one example and without imputing limitation, the following function: floor (normalized_conc*Q)/Q. The argument "normalized_conc" directs the function to the channel. In this example, the notions of normalizing, smoothing and quantizing are within the overall function of preprocessing the channel.

Using the preprocessed channel, a derived (higher order) proppant ramp channel (operation 204) is created by identifying when the quantized proppant concentration is greater than a value $Q_{min}$ (e.g., zero) and zero otherwise. The system then fills in potential gaps in the proppant ramp channel using a centered robust smoother $S_2$ (e.g., centered 61 second median smoother). FIG. 4 shows a plot of a normalized bottomhole proppant concentration channel (FIG. 4A), a quantized bottomhole proppant concentration channel (FIG. 4B), and a resulting derived proppant ramp channel (FIG. 4C). It can be seen that the proppant ramp indicators 42 of the ramp channel (4C) each may encompass more than one discrete proppant step 40 between when a set of steps start and end.

Blocks 42 that are not more than a threshold time length, $T_{min}$ (e.g., 600 seconds, etc.), are removed. This rule can be modified and/or extended to a volume or shape filter. Thus, the data may be filtered (operation 208). In this case, the higher order channel data is filtered prior to combination, as discussed below. However, the data may be filtered after combining.

Having identified one or a group 42 of discrete proppant steps, the system may then obtain statistics for the identified ramp. In one example, depending on the statistics to be generated, the system may combine the derived proppant ramp channel with other channels and scale the channels such that the data of each channel is aligned, should the time scales of the data otherwise differ (operation 206). In one example, the system identifies a block (group) of proppant steps associated with completing a stage and identifies selected data, which may involve computations, for each block, which associates those statistics with the stage being hydraulically fractured or otherwise processed. So, in this case, the feature of interest (operation 210) is the proppant ramp or ramps and any data related to the proppant ramps. Relevant statistics for each proppant ramp or block may include, for example and without imputing limitation, duration of the proppant ramp, mean slurry rate or other slurry rate data, mean treating pressure or other treating pressure data, and mean bottomhole proppant concentration.

The system may then, in a user interface or other form, identify the proppant ramps and display data associated with the relevant statistics for each block of proppant ramps (operation 212). The system may further use the information for feedback to the system for processing subsequent stages or wells. Parameters that may be optimized in any given implementation include, for example and without imputing limitation, $S_1$, Q, $Q_{min}$, $S_2$, and $T_{min}$.

B. Acid at Perforations

In another example, the system may generate a higher order channel as part of a process to identify when acid (e.g., a treatment chemical, etc.) reaches downhole perforations during hydraulic fracturing of a well. In some hydraulic fracturing operations, acid may be used to effectively etch channels in fractures formed in the formation. It is often the case that there is no field access to a dedicated acid concentration channel and/or an acid volume data channel; however, in accordance with aspects of the present disclosure, the system may generate acid information using other more prevalent data channels, such as bottomhole proppant concentration, etc. In operations using both acid and proppant, the system may use information associated with bottomhole proppant concentration due to the various relationships between proppant operations and acid operations during hydraulic fracturing. Generally speaking, the system may use bottomhole proppant concentration as an initial channel to generate new channels and perform further processing of the same. In particular, because bottomhole proppant concentration is a channel calculated at a well site surface and derived from surface proppant concentration, pipe volume, and slurry rate data, various information is embedded within the bottomhole proppant concentration data and derivable from it to provide insights into acid operations.

Figure 5:
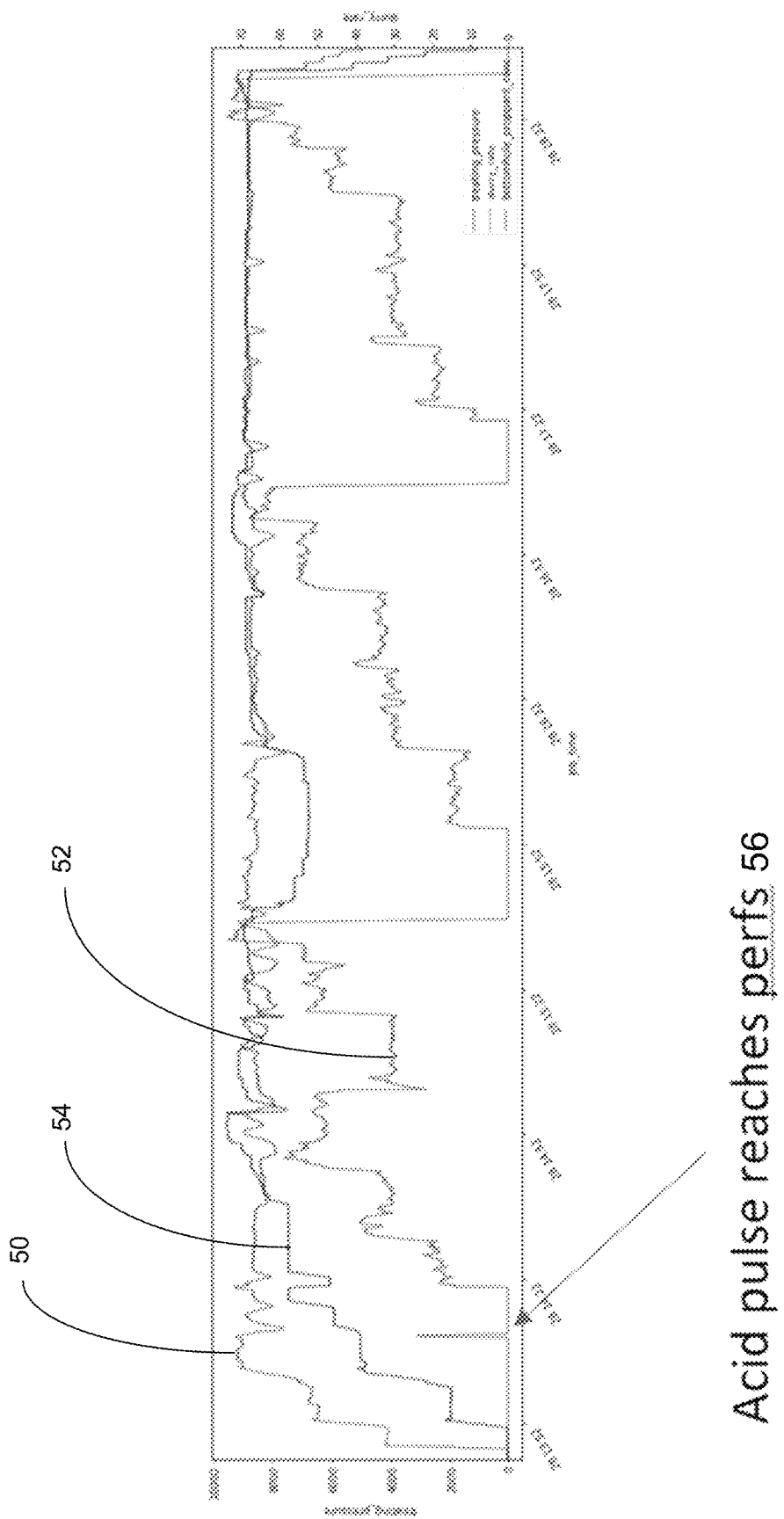
FIG. 5 is a plot of time series data for hydraulically fracturing a well, the time series data including bottomhole proppant concentration, slurry rate, and treating pressure and identifying an acid pulse in accordance with embodiments hereof.

In general, the procedure employed by the system for determining when acid arrives at downhole perforations includes accessing the relevant data (operation 200) and first normalizing the bottomhole proppant concentration channel and recalibrating the normalized channel. The system may also use slurry volume and proppant ramp data channels (with the proppant ramp channel generated as above). The system uses the channels to generate a list of proppant ramp intervals—e.g., proppant ramp blocks as discussed above. The list of proppant ramp intervals may then be used, along with the other channels, to identify short and/or low volume pulses in the bottomhole proppant concentrations which precede an initial proppant ramp in a series of proppant ramps defining an interval (block) (e.g., volume increase of over 600 seconds, etc.). FIG. 5 displays a result plot of the process in which times at which acid pulses reaching the perforations have been identified. The plot includes treating pressure 50, bottomhole proppant concentration 52, slurry rate 54 and a generated identification 56 when acid has reached the perforations.

Figure 6A:
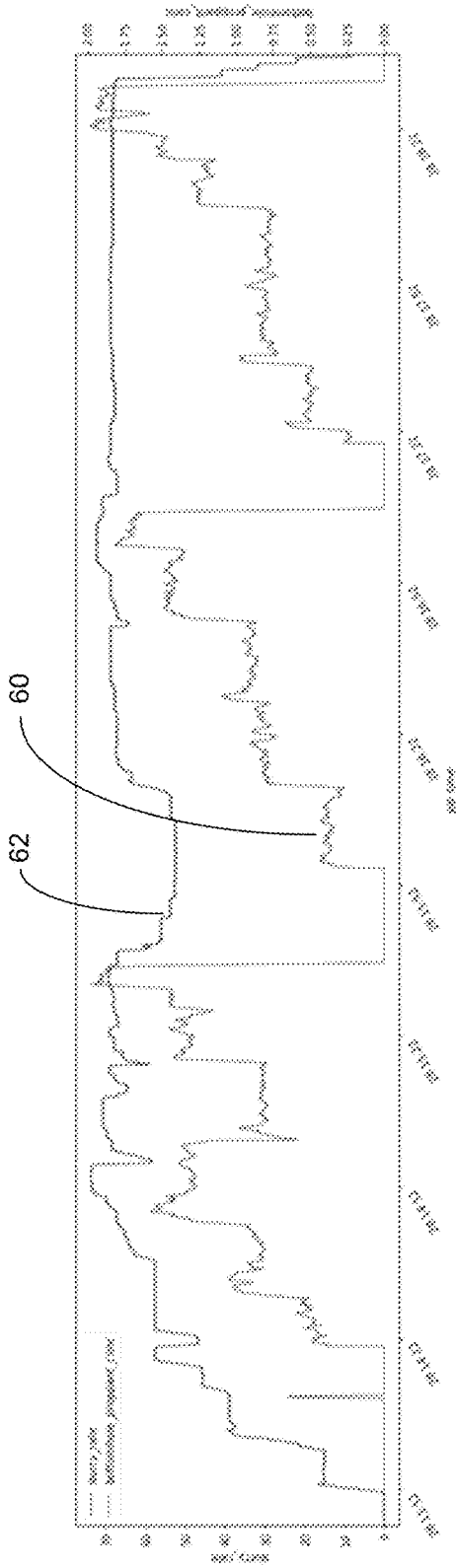
FIG. 6(A) is a plot of time series data for hydraulically fracturing a well, the time series data including bottomhole proppant concentration and slurry rate.

In more detail, the process employed by the system to identify when acid reaches perforations in a stage during hydraulic fracturing operations, may begin with accessing the bottomhole proppant concentration channel and slurry rate channel (operation 200), and then preprocessing the bottomhole proppant concentration channel and the slurry rate channel (operation 202). FIG. 6A is a plot of the initial two channels of interest—bottomhole proppant concentration 60 and slurry rate 62. In this example, preprocessing involves the system first determines whether the data values in each channel are in chronological order, and if not, rearranges any values out of order. The system also deletes any data entries without a respective slurry rate or bottomhole proppant concentration value. The system, like the proppant ramp process described above, calibrates the channels by clipping (changing) any negative bottomhole proppant concentration values and/or slurry rates to zero values. The channels may then vertically shifted to ensure the minimum value is zero.

Figure 6B:
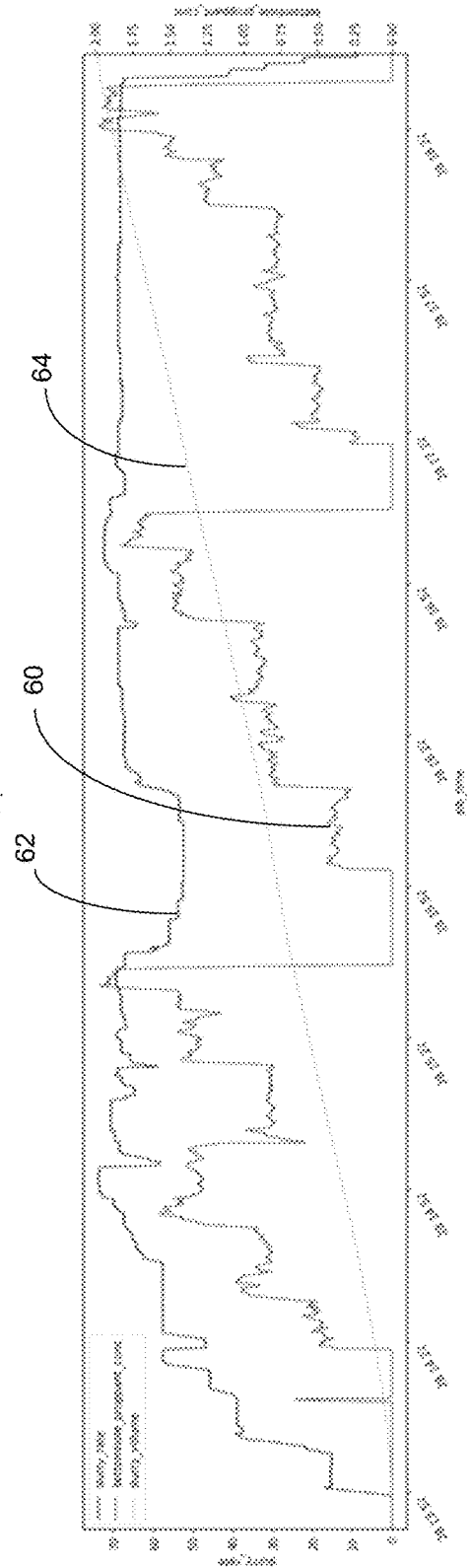
FIG. 6(B) is a plot of time series data for hydraulically fracturing a well, the time series data including bottomhole proppant concentration and slurry rate of FIG. 6(A) along with a derived higher order slurry volume channel in accordance with embodiments hereof.

The system then generates a slurry volume channel 64 (operation 204) and adds it to the data as illustrated in FIG. 6B (operation 206). This combined higher order channel and original channels may be provided for display. The system uses a data channel of slurry rate to compute the slurry volume channel. In more detail, the system computes time differences between successive pairs of slurry rate data and generates a sampling frequency as the most commonly occurring time difference, although averaging, mean or median values and the like may also be used. The system then computes a slurry volume (in BBL units) channel based on a cumulative sum of the slurry rate (bbl/min) scaled appropriately using the sampling frequency.

In the way described above, the system also generates a proppant ramp channel. To generate the new channel, the system preprocesses the bottomhole proppant concentration channel as discussed above. For example, the system smoothes the bottomhole proppant concentration channel using a centered short window robust smoother $S_1$ (e.g., centered 11 second median smoother) and then the smoothed channel is normalized to a range of values between zero and one. The normalized and smoothed proppant ramp channel is quantized into Q (e.g., Q=100) evenly-spaced discrete steps using the following function: floor (normalizedconc*Q)/Q.

Figure 8A:
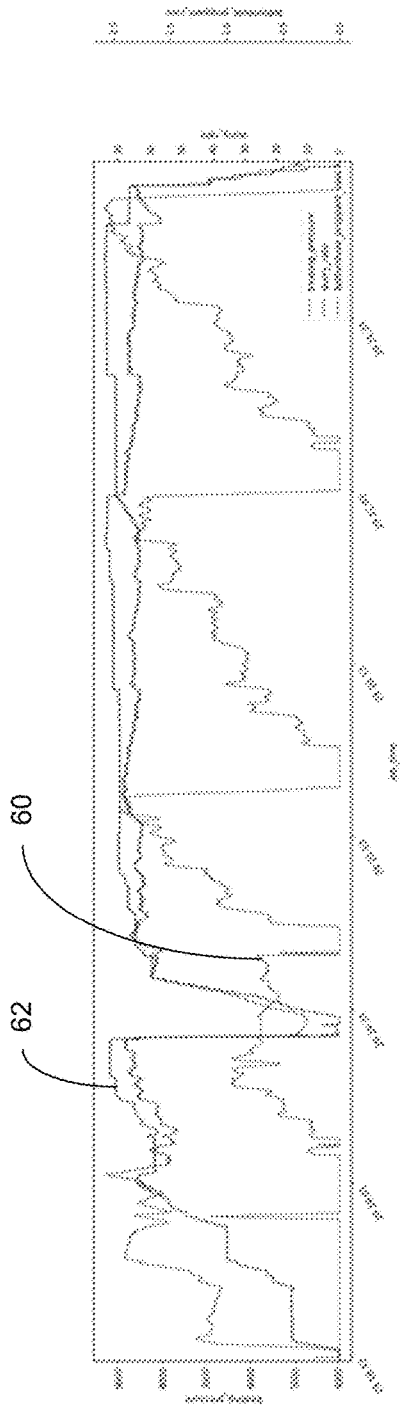
FIG. 8(A) is a plot of time series data for hydraulically fracturing a well, the time series data including bottomhole proppant concentration, slurry rate, and treating pressure.

The system then derives a proppant ramp channel by determining where the quantized proppant concentration is greater than $Q_{min}$ (e.g., zero) and zero otherwise. The system fills potential gaps in the proppant ramp channel using a centered robust smoother $S_2$ (e.g., centered 61 second median smoother). FIG. 8(A) shows the slurry rate and bottomhole proppant concentration channels and FIG. 8(B), temporally aligned with FIG. 8(A), shown shows a plot of the derived higher order proppant ramp channel 70 aligned with the slurry rate 62 and the bottomhole proppant concentration 64 channels of FIG. 8A. Here, the derived proppant ramp channel may be combined with the slurry rate and concentration channels (operation 206). The channels are scaled if necessary.

It can be seen from FIGS. 7A and 7B that each block 72 encompasses one or more discrete steps 74. The system divides the derived proppant ramp channel into these respective blocks (e.g., identifies the predicted proppant ramp or ramps). As with above, the system may also calculate additional data and statistics for each block delineated by the time frame encompassing proppant ramps, and with the statistics reflective of hydraulic fracturing operations for a stage. Calculated statistics may include, for example and without imputing limitation, ramp duration and slurry volume. The system also identifies the earliest block 70 falling above a threshold length of time, $T_{min}$ (e.g., at least 600 s), and identifies that block as the earliest proppant ramp (the first proppant ramp associated with fracturing a specific stage).

Figure 8B:
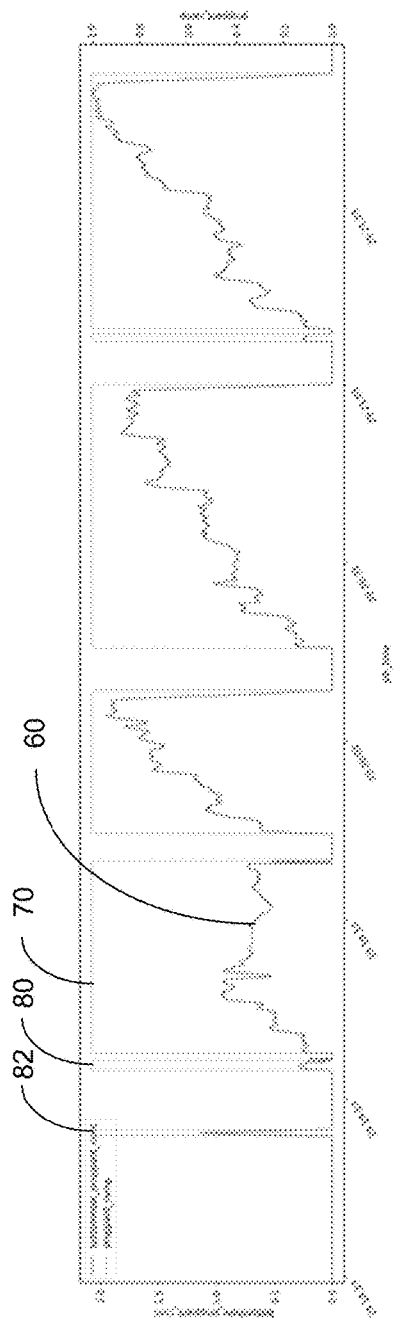
FIG. 8(B) is a plot of a derived proppant ramp channels for the data of FIG. 8(A)
Figure 8C:
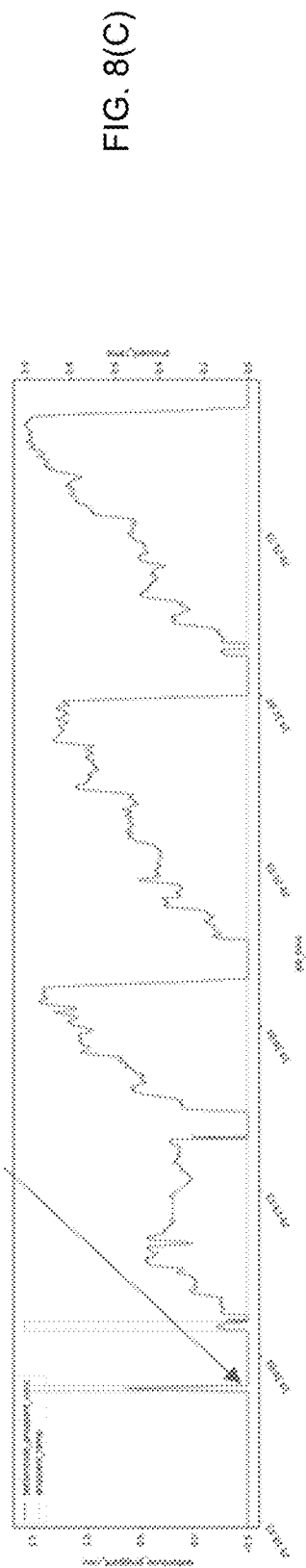
FIG. 8(C) is a plot of possible acid pulse channels preceding the earliest proppant ramp channel of FIG. 8(B), with the highest proppant concentration value channel representing the acid pulse location in accordance with embodiments hereof.

The system then uses the earliest proppant ramp 70 to identify acid pulses, which should proceed the earliest ramp block. Hence, the feature of interest is the acid pulse (operation 208). Referring to FIGS. 8(A)-8(C), the system identifies job times (or whatever temporal characteristic is used for the various data channels) in the relevant data channels that precede the identified earliest proppant ramp 70. In more detail and in one example, the system analyzes the slurry volume channel 62 and bottomhole proppant concentration channel 60 during the time preceding the first identified proppant ramp 70. Proppant ramps are classified as potential acid pulses where the respective slurry volume lies in a predetermined range $[V_{min}, V_{max}]$ (e.g., [13.3, 250] bbls), and a respective maximum bottomhole proppant concentration is at least $C_{min}$ ppa (e.g., 0.1 ppa). In the example of FIG. 8(B), two acid pulse candidates 80 and 82 precede the first block 70. When multiple potential acid pulses are found, the acid pulse with the highest maximum bottomhole proppant concentration is returned. In this example, the peak of pulse 82 is higher than the peak of pulse 80 indicating it has a higher bottomhole proppant concentration and hence is the acid pulse 84 (FIG. 11(C)). This is only one possible selection rule and, for example, earliest potential acid pulse or other selections rules could instead be used.

The proppant ramp recognition model may also be used to further recognize chemical concentration changes. Parameters that are jointly optimized include, for example and without imputing limitation, $S_1$, Q, $Q_{min}$, $S_2$, $T_{min}$, $V_{min}$, $V_{max}$, and $C_{min}$.

C. Target Slurry Rate

Figure 9:
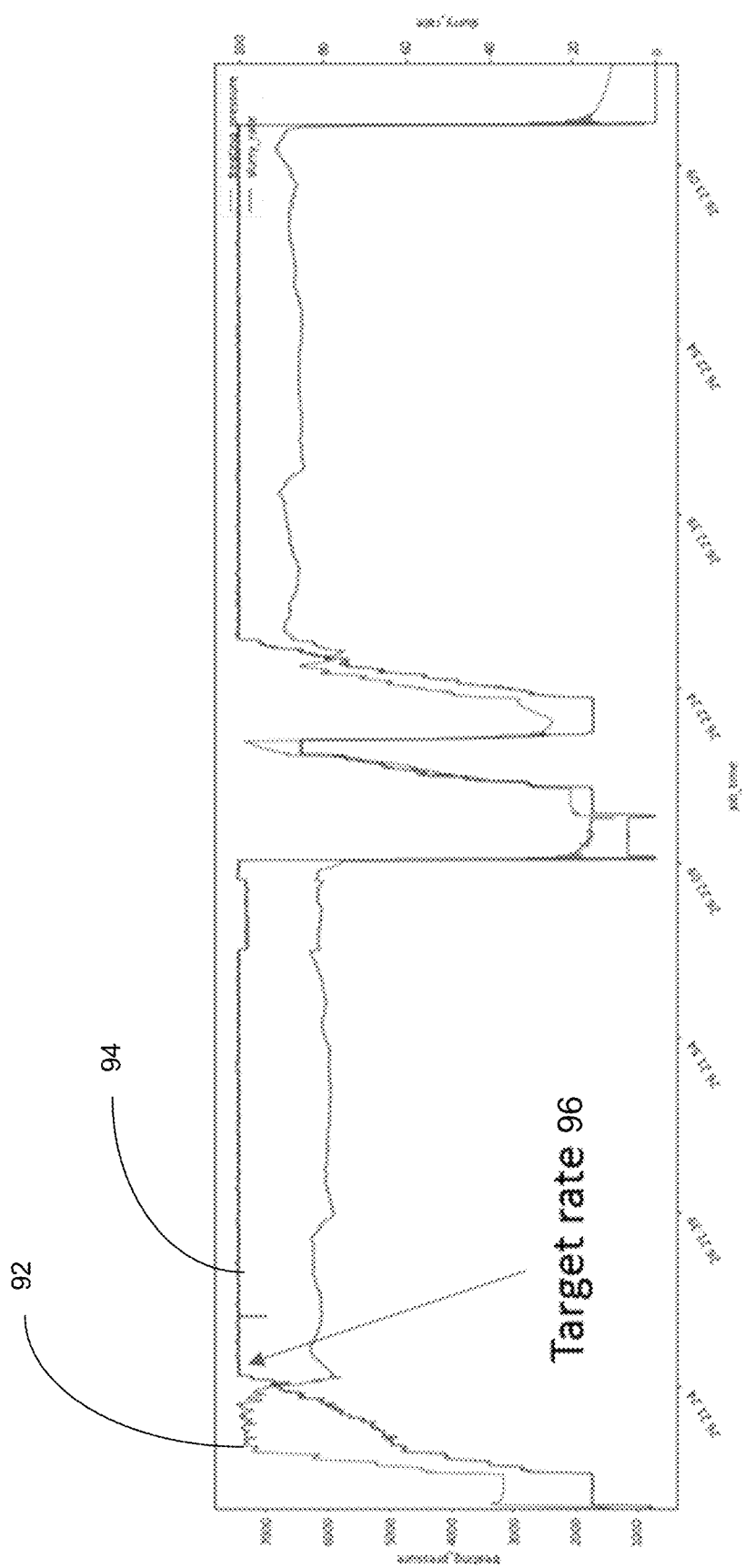
FIG. 9 is a plot of time series data for hydraulically fracturing a well, the time series data including treating pressure and slurry rate with a target rate location identified in accordance with embodiment hereof.

In yet another example, the system may generate and use additional channels, beyond those of the raw data, to detect when a hydraulic fracturing stage achieves a target slurry rate. FIG. 9 illustrates treating pressure 92 and slurry rate 94 channels, and identifies when the slurry rate reaches a target rate 96 for the stage being hydraulically fractured. The system is able to automatically identify time when the target rate is achieved, and the system to do so, first preprocesses the data including normalizing and calibrating the data. Higher order, or derived, channels are then calculated and the slurry rate is plotted against the derived slurry volume, also a computed channel, using interpolation. A signal channel is computed that peaks at a plateau in the slurry rate. Points where slurry volume is associated with a maximum value of the signal channel are then identified, which are then used to identify job times corresponding to the points and hence when the target slurry rate is achieved.

Figure 10:
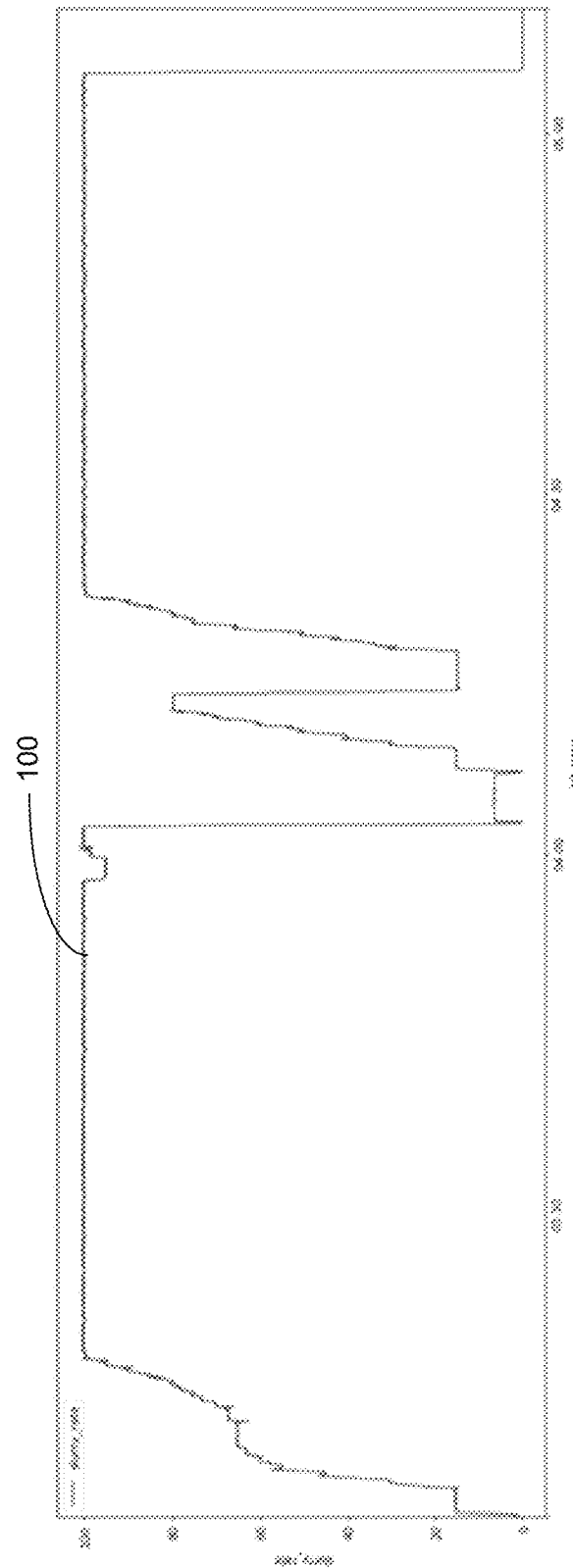
FIG. 10 is a plot of time series data for hydraulically fracturing a well, the time series data including slurry rate.
Figure 11:
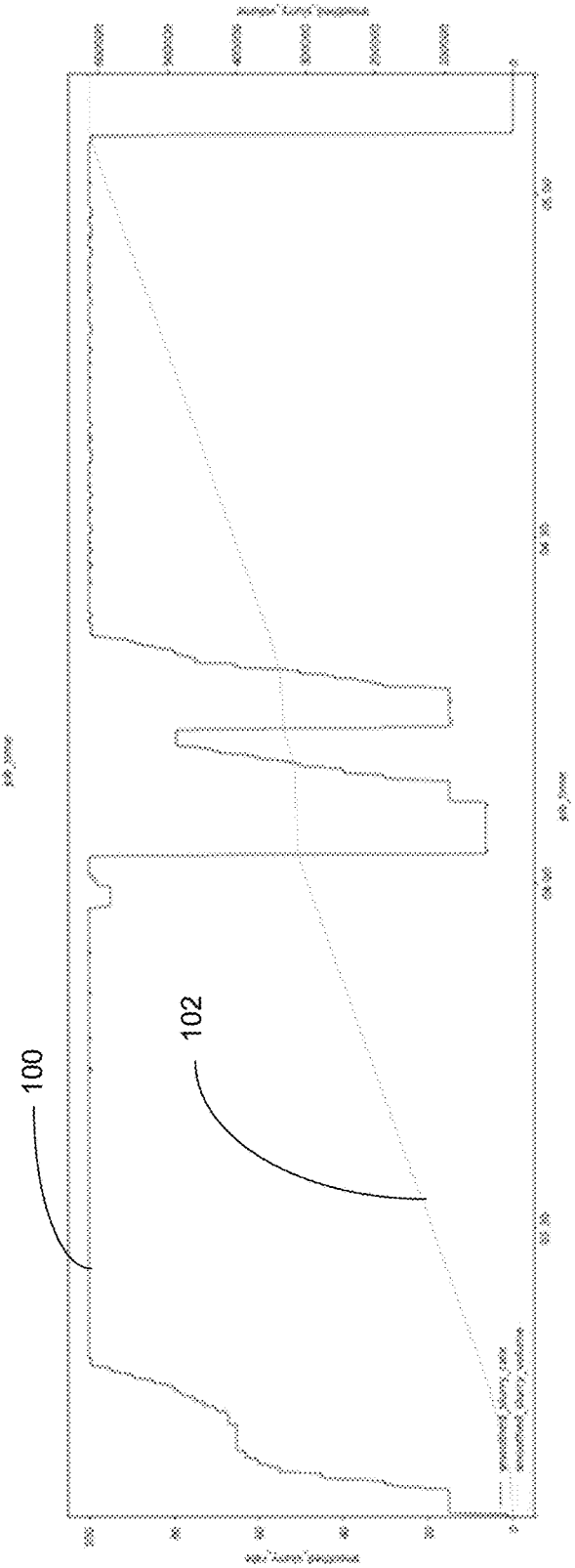
FIG. 11 is a plot of the slurry rate of FIG. 10 combined with a derived slurry volume channel.

To begin, and as illustrated in the FIG. 10, the system first accesses the slurry channel 100 (operation 200) and the system preprocesses the channel using normalization and calibration. For example, data of the isolated slurry rate channel is arranged in chronological order and rows with missing, or partial, slurry rate data are removed. Any remaining data pairs with a negative slurry rates are clipped to zero (0) and then the channel is vertically shifted to ensure the minimum value is zero (0). The system may also smooth the channel 100. The system then may compute and generate a slurry volume channel 102 (operation 204). FIG. 11 is one example of the generated slurry volume channel 102 combined with the slurry rate channel 100 (after preprocessing). To derive the higher order slurry volume channel, the system quantizes the slurry rate with a step size Q (e.g., 2 bpm), using, for example and without imputing limitation, a formula Q*floor(slurry rate/Q). The resultant quantized slurry rate (e.g., quantized signal) is smoothed using, for example, a centered medium-length robust filter $S_1$ (e.g., a 31 second centered median filter). The system then generates a smoothed slurry volume channel based on the cumulative sum of the smoothed slurry rate channel.

Slurry rate versus slurry volume may then interpolated to minimize the impact of large gaps between pumping, and to emphasize periods of high slurry rate. The system generates a slurry volume grid using $V_{grid}$ barrel intervals (e.g., one (1) barrel or one (1) gallon). A function for comparing the smoothed slurry rate to the smoothed slurry volume channels is then created by linear interpolation at a resolution corresponding to the slurry volume grid. The interpolated slurry rate signal is transformed so that respective starts of rate plateaus become peaks. For example, a peaking transform function can be applied to the interpolated slurry rate tin the form of Pk(t)=d/dt (g[C+$\int_0^t$ r(t) dt]), where g is an increasing function with a decaying derivative (e.g., log or square root) and C is a shifting constant that controls the rate of decay. In some cases, C can be replaced with a function C($V_{total}$), where $V_{total}$ is the total slurry volume channel, for a more fine-grained control of the decay. FIG. 12A illustrates the slurry rate channel 100 of FIG. 11 processed according to Pk(t). FIG. 12(B) shows a sequence of finding the slurry volume and time of the peak (as indicated by the arrow). The system identifies the smoothed slurry volume 120 associated with the maximum value of the transformed signal, and then a corresponding job time 122 (or other temporal indicator) as shown in FIG. 12(B) is identified for when the target slurry volume was reached.

In this example, parameters to jointly optimize may be $S_1$, Q, $V_{grid}$, and g.

D. Estimate Flush Volume

Figure 13A:
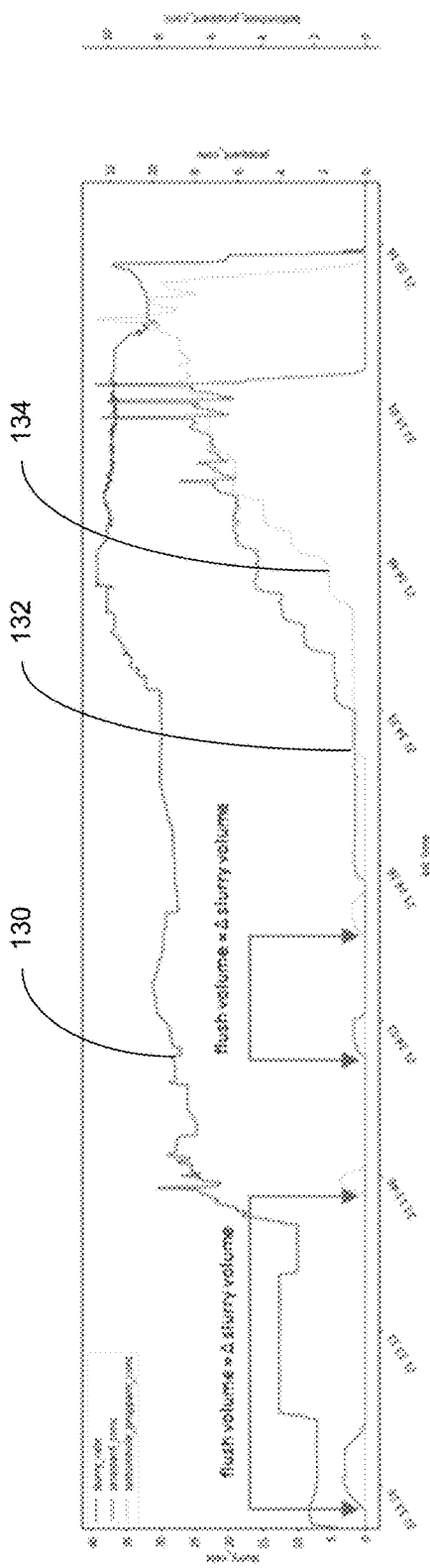
FIGS. 13(A) and 13(B) illustrate data for hydraulically fracturing a well, the data including slurry rate, proppant concentration and bottomhole proppant concentration and information related to flush volume identified therein.
Figure 13B:
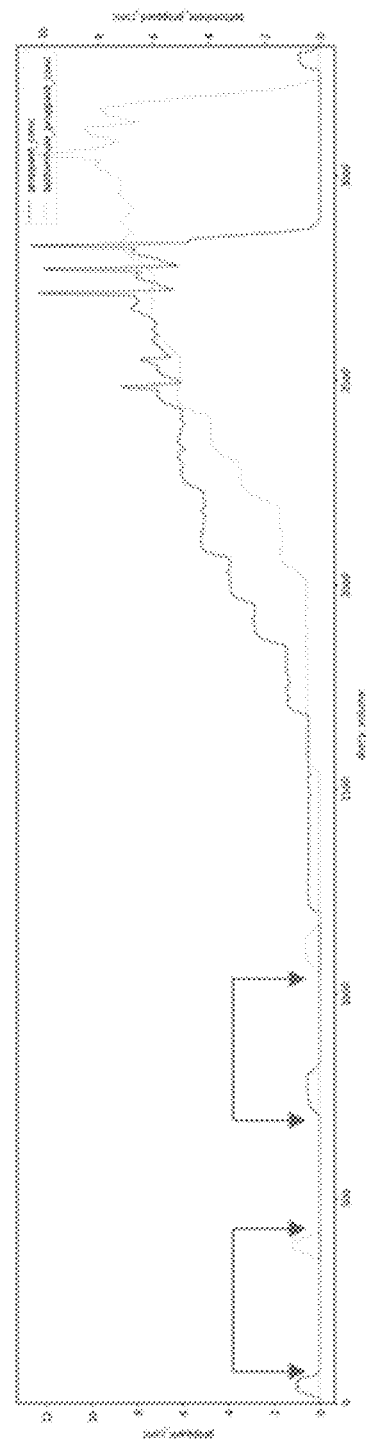

In another example, the system, identifies and estimates flush volumes using derived higher order channels. The flush volume refers to the volume of fluid that may be pumped into a stage, typically at the end of hydraulically fracturing the stage, to flush out any excess proppant from the stage. FIG. 13A illustrates data channels of slurry rate 130, proppant concentration 132 and bottom-hole proppant concentration 134 and FIG. 13B illustrates proppant concentration and bottom-hole proppant concentration, with flush volume being the change in slurry volume between the denoted locations in FIG. 13A (time being the X axis) and the flush volume change versus slurry volume (X axis) in FIG. 13B. In FIG. 13(A) the length of the change in slurry volume changes which makes estimating the change difficult. However, in FIG. 13(B) by switching to the slurry volume x-axis the length of the change becomes constant making it easier for the system to recognize. One key idea is to match the surface proppant concentration shape to the bottomhole prop concentration shape by shifting the signals until they overlap. The volume of the shift is the flush volume. This is challenging with time on the x-axis because the slurry rate changes and the "shift" volume changes (which means you need to "squish" or "stretch" the signals as well as shifting them to get them to match). By changing the x-axis to volume the "shift" length becomes constant and easy to identify (no "squishing" or "stretching" is necessary).

Accordingly, flush volume takes advantage of a derived slurry volume channel. In general to estimate flush volumes, like other methods discussed herein, the data channels are accessed and the data is normalized. To further process the data, a sampling frequency is determined. The channels are then recalibrated. A function between surface and/or bottomhole proppant concentrations and slurry volume, derived from slurry rate as discussed herein, is created using interpolation and shown in FIG. 15B, and then a surface proppant concentration pattern (e.g., a "motif") is cross-correlated with the bottomhole proppant concentration using the interpolated relationships. A peak correlation is then found and a corresponding slurry volume is identified.

FIG. 14A shows normalized data, the same channels 240, 242, and 244 as shown in FIG. 13A, from which a sampling frequency is estimated. As with other methods discussed herein, the data is preprocessed. In this example, data for the isolated channels is arranged in chronological order and any missing or partial data is removed. Time differences between successive pairs of points are then calculated and a modal (e.g., most common) time difference is used to estimate a sampling frequency.

The channels may then be calibrated, as shown in FIG. 14B. Negative rates and/or concentrations are clipped to zero (0) and a slurry volume channel 246 is determined based on the slurry rate as a running sum, as otherwise discussed herein. The slurry volume channel is normalized using the sampling frequency to ensure that respective units of volume are consistent with the rate. For example, barrels per minute (bpm) match barrels, gallons per minute for gallons, etc. The channels are then vertically shifted to ensure respective minimum values are zero (0).

FIG. 13B, introduced above, shows interpolation of slurry rate against concentration channels (proppant and bottom-hole proppant). A slurry volume grid is created at $V_{grid}$ barrel intervals (e.g., 1 barrel or 1 gallon). A function for proppant and bottomhole proppant concentrations against the smoothed slurry volume is created based on linear interpolation at a resolution corresponding to the slurry volume grid. As a result, the shape of the surface and bottomhole proppant concentration channels become substantially similar and shifted horizontally (relative to each other) by flush volume, as shown in FIG. 13B.

Figure 15A:
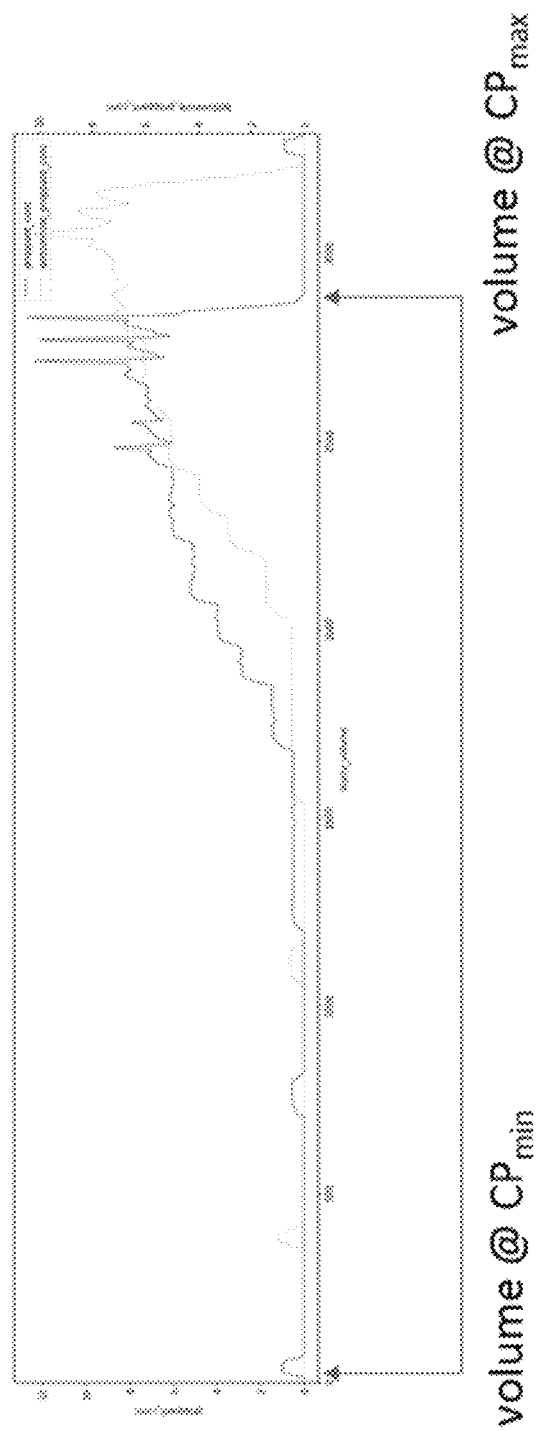
FIG. 15(A) is a time series plot including proppant concentration and bottomhole proppant concentration channels arranged by slurry volume, and cumulative proppant volumes identified.

FIG. 15A shows a proppant concentration motif that is generated based on the functions above. A derived channel (e.g., cumulative proppant (CP)) is created that is the cumulative sum of the proppant concentration normalized to lie between zero (0) and one (1). A motif is then created by isolating a subset of the proppant concentration channel for which the cumulative proppant is greater than $CP_{min}$ (e.g., where cumulative proppant is 0) and cumulative proppant is less than $C_{max}$ (e.g., where cumulative proppant is 0.99). The motif generally corresponds to a shape sought to be matched in the bottomhole proppant concentration series.

Figure 15B:
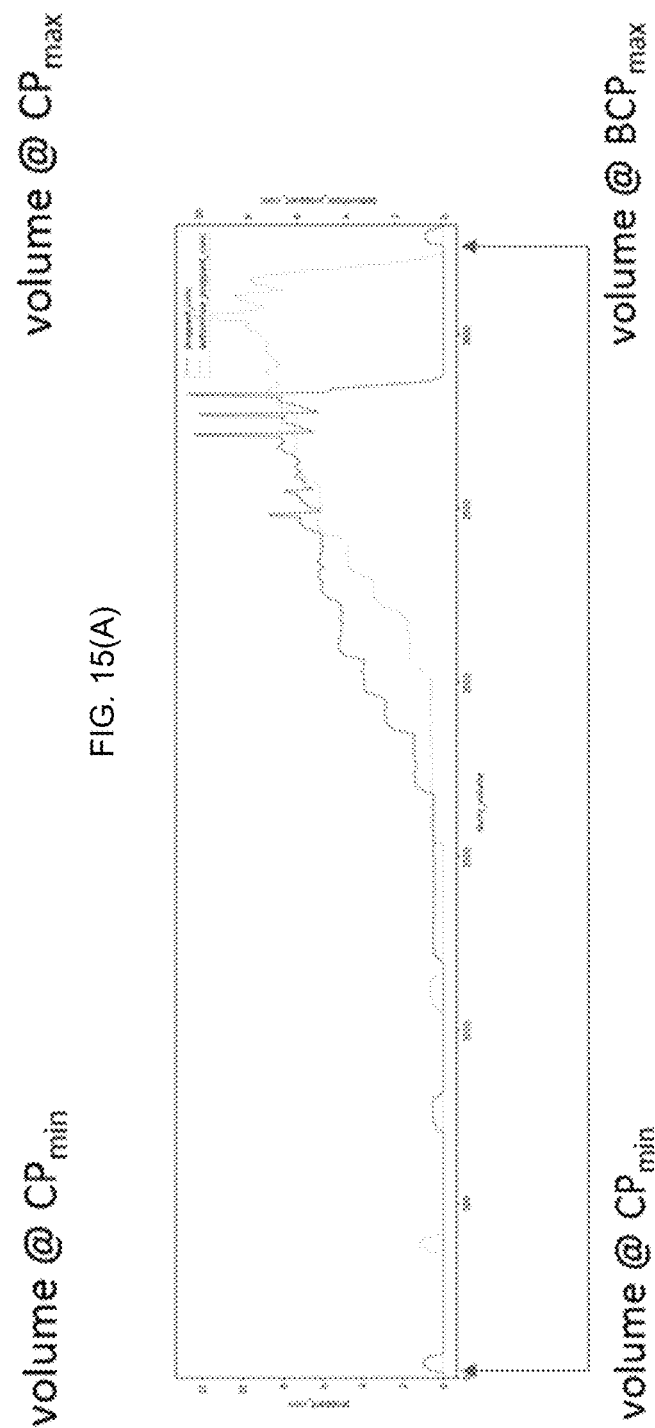
FIG. 15(B) is a time series plot including proppant concentration and bottomhole proppant concentration channels arranged by slurry volume, and cumulative bottomhole proppant concentration values identified.

A bottomhole concentration is series is then built for matching, as shown in FIG. 15(B). A derived channel (e.g., bottomhole cumulative proppant) is created that is the cumulative sum of the bottomhole proppant concentration normalized to lie between zero (0) and one (1). A series is generated that can be used to match against by isolating a subset of the bottomhole proppant concentration channel where cumulative proppant is greater than the cumulative proppant minimum and the bottomhole cumulative proppant is less than the bottomhole cumulative proppant maximum, which should be greater than the cumulative proppant maximum. In particular, the lower volume bound for the matching series uses the surface cumul_prop condition used when constructing the motif. This guarantees that the slurry volumes associated with the motif are strictly subsumed by the range of slurry volumes for the bottomhole concentration series.

Figure 16:
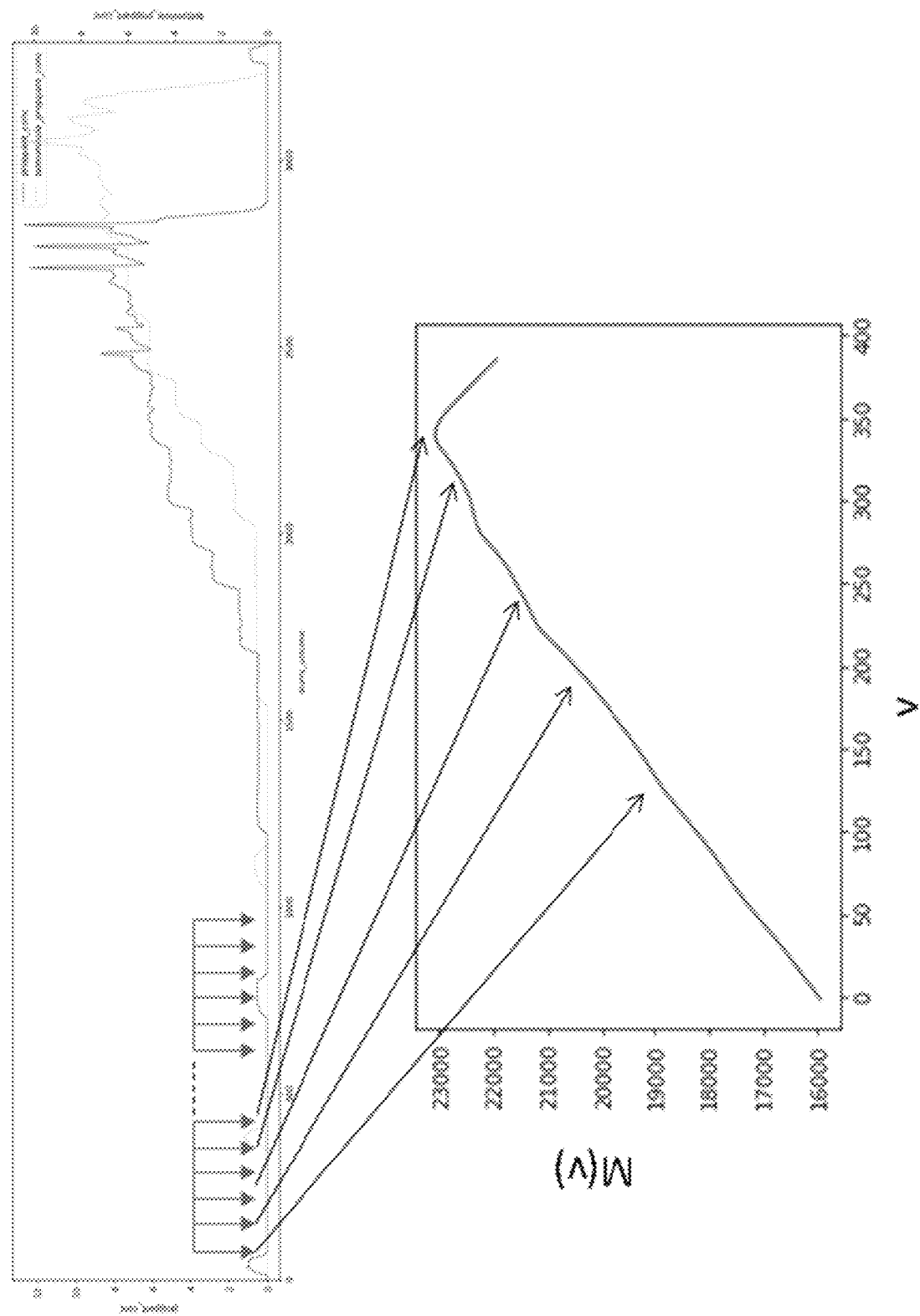
FIG. 16 is a diagram illustrating a cross correlation between the information of FIGS. 15(A) and 15(B) with a function.

FIG. 16 shows computing cross-correlations. The motif and corresponding bottomhole series are centered by subtracting a mean value of the proppant concentration motif. In general, the correlation may be more informative when the data is mean-centered. The cross-correlation between the surface concentration motif and the corresponding bottomhole concentration is then computed using, for example, a function of the form $M(v)=\Sigma_{l=0}^{l=|S|-1}(s(l)b(l-v+|B|-1))$. $M(v)$ may be the correlation at volume v, s may be the slurry rate motif, b may be the corresponding bottomhole series, |S| may be the length of the motif, and |B| may be the length of the corresponding bottomhole series. As a result, the sliding the motif against the bottomhole series is computationally represented and a score quantifying the quality of the correspondence (e.g., match) is generated given the volume of the slide. The two series may overlap at the maximum value of $M(v)$.

Figure 17:
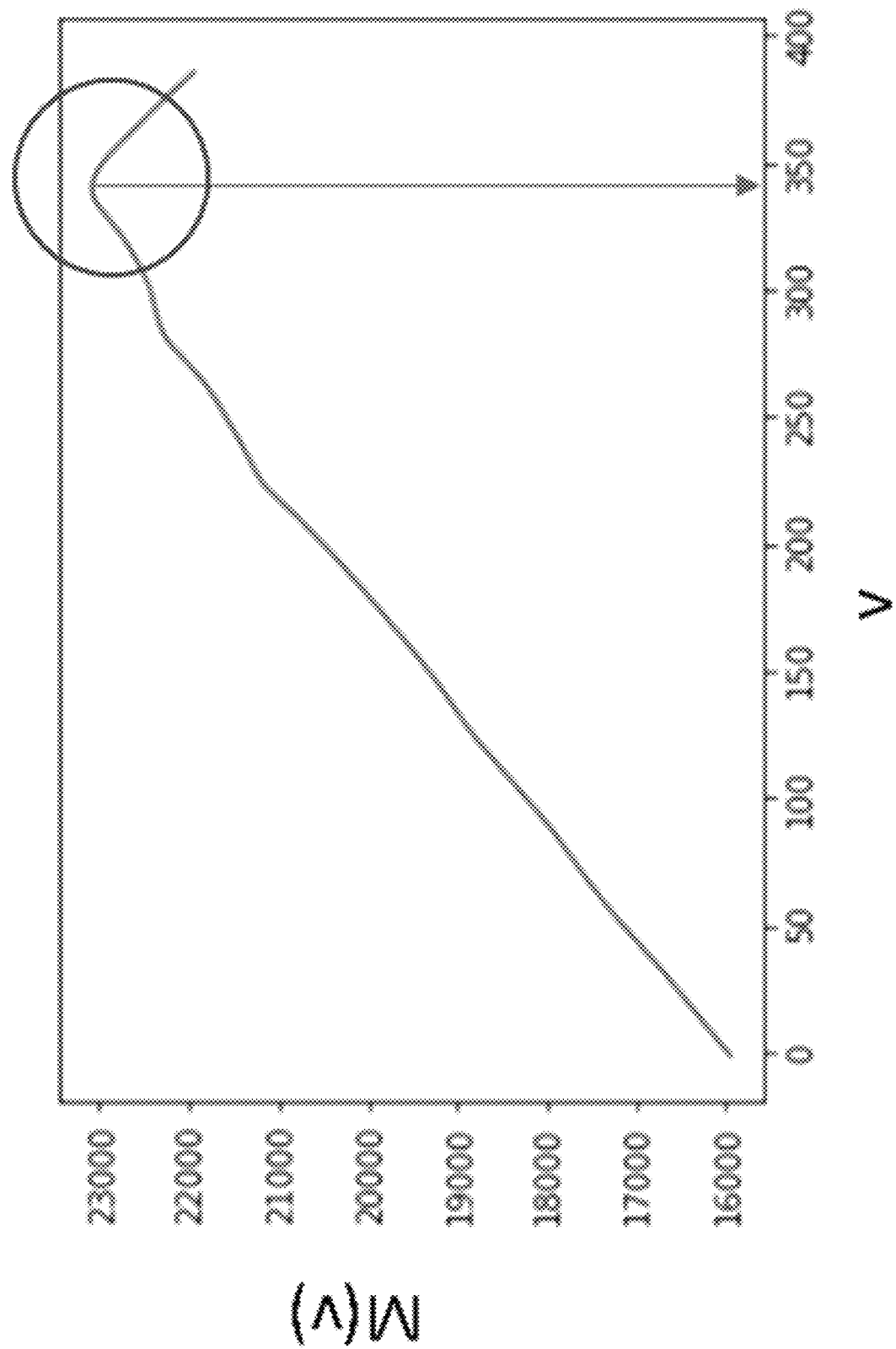
FIG. 17 is a diagram illustrating an indication of a peak correlation corresponding to volume.

FIG. 17 shows an identification of the peak correlation and corresponding volume. The peak of the cross-correlation $M(v)$ occurs at the best match of the surface concentration motif against the bottomhole proppant concentration motif. The corresponding volume at the peak is then estimated and is the flush volume.

In this example, parameters to jointly optimize may be $CP_{min}$, $CP_{max}$, $BCP_{max}$, and $V_{grid}$.

E. Time when Proppant Reaches Perforations

Figure 18:
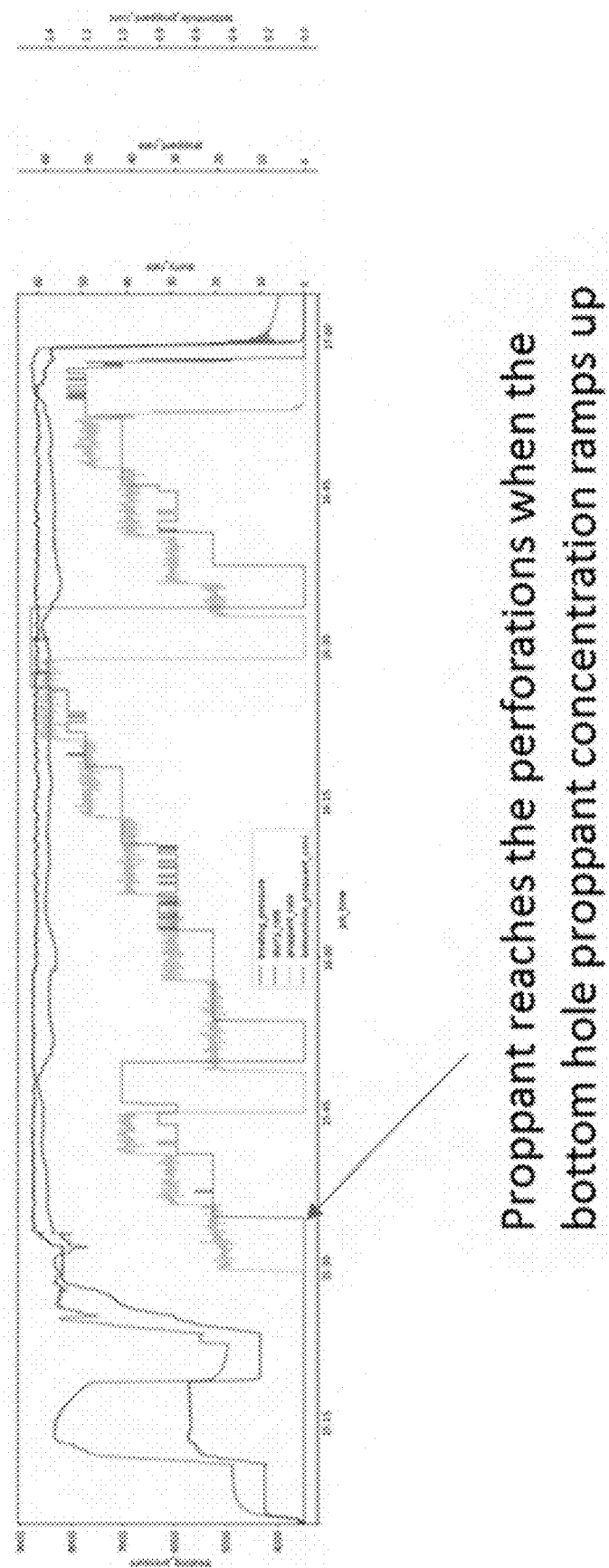
FIG. 18 is a plot of time series data for hydraulically fracturing a well, the time series data including treating pressure, slurry rate, proppant rate and bottomhole proppant concentration, and with a time when proppant reaches perforations in a stage being completed identified in accordance with embodiments hereof.

In one example, proppant values and/or presence at perforations can be detected using derived or higher order channels, as shown in FIG. 18. In particular, bottomhole proppant concentration, which is a channel calculated at the field and derived from the surface proppant concentration, the pipe volume, and the slurry rate, can be used to determine when proppant reaches perforations in a hydraulic fracture well. In general, the accessed data channel is preprocessed, which may include normalization and calibration. The preprocessed data is then updated to include a calculated proppant ramp channel to identify points that most likely belong to a proppant ramp. A list of proppant ramp intervals (e.g., start/end job time pairs) is then created and the first proppant ramp interval that is long enough to be considered a true proppant ramp (e.g., 600 seconds) is identified, as discussed elsewhere herein.

In the manner discussed with regard to FIGS. 3 and 4 and elsewhere, the system determines proppant ramps and then the system determines the earliest proppant ramp. The system identifies the earliest proppant ramp as shown in FIG. 4(B). It can be seen from comparing FIG. 4A to 4B, discrete proppant steps may be subsumed in proppant ramp blocks and the first block that is of sufficient length Turin (e.g., at least 600 seconds, etc.) is identified. $T_{min}$ can be modified and/or extended to a volume or shape filter accordingly. The time of the first block correlates to when the proppant reaches the perforations and is flagged 44 as shown in FIG. 4(C) and noting that the X axis is time.

In this example, parameters to jointly optimize may be $S_1$, Q, $Q_{min}$, $S_2$, and $T_{min}$.

Figure 19A:
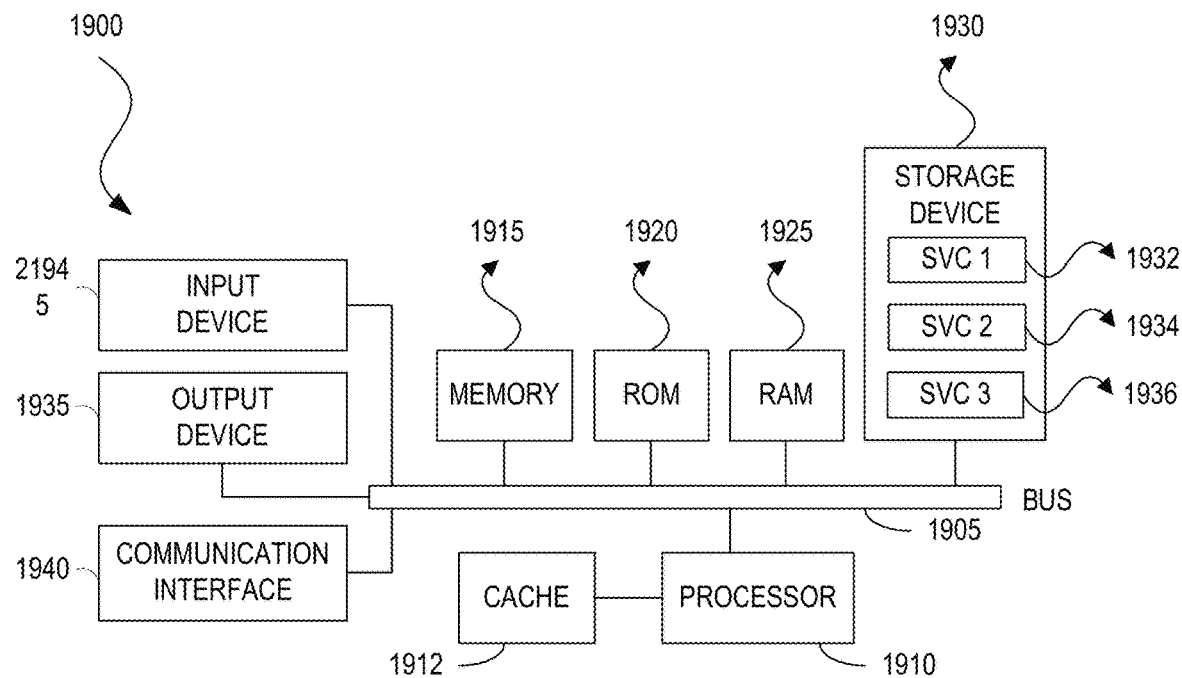
FIGS. 19(A) and 19(B) illustrate systems, according to one aspect of the present disclosure.
Figure 19B:
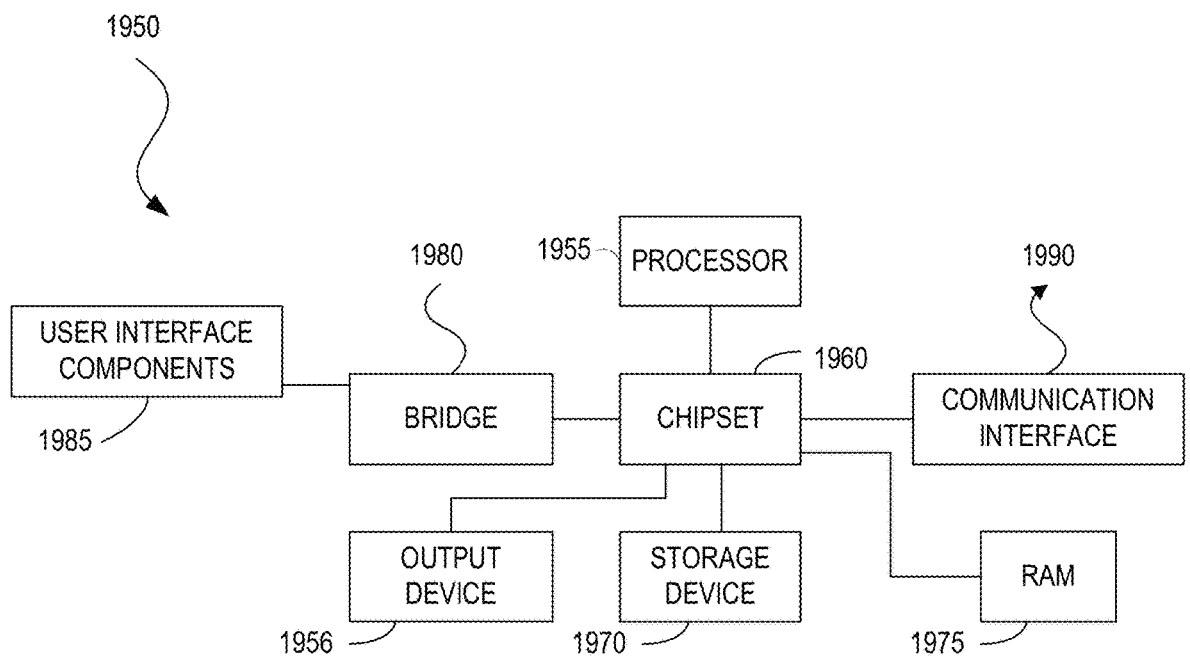

FIGS. 19A and 19B illustrate systems, according to one aspect of the present disclosure. The more appropriate system will be apparent to those of ordinary skill in the art when practicing the various embodiments. Persons of ordinary skill in the art will also readily appreciate that other systems are possible.

FIG. 19A illustrates an example of a bus computing system 1900 wherein the components of the system are in electrical communication with each other using a bus 1905. The computing system 1900 can include a processing unit (CPU or processor) 1910 and a system bus 1905 that may couple various system components including the system memory 1915, such as read only memory (ROM) 1920 and random access memory (RAM) 1925, to the processor 1910. The computing system 1900 can include a cache 1912 of high-speed memory connected directly with, in close proximity to, or integrated as part of the processor 1910. The computing system 1900 can copy data from the memory 1915, ROM 1920, RAM 1925, and/or storage device 1930 to the cache 1912 for quick access by the processor 1910. In this way, the cache 1912 can provide a performance boost that avoids processor delays while waiting for data. These and other modules can control the processor 1910 to perform various actions. Other system memory 1915 may be available for use as well. The memory 1915 can include multiple different types of memory with different performance characteristics. The processor 1910 can include any general purpose processor and a hardware module or software module, such as services (SVC) 1 1932, SVC 2 1934, and SVC 3 1936 stored in the storage device 1930, configured to control the processor 1910 as well as a special-purpose processor where software instructions are incorporated into the actual processor design. The processor 1910 may essentially be a completely self-contained computing system, containing multiple cores or processors, a bus, memory controller, cache, etc. A multi-core processor may be symmetric or asymmetric.

To enable user interaction with the computing system 1900, an input device 1945 can represent any number of input mechanisms, such as a microphone for speech, a touch-protected screen for gesture or graphical input, keyboard, mouse, motion input, speech and so forth. An output device 1935 can also be one or more of a number of output mechanisms known to those of skill in the art. In some instances, multimodal systems can enable a user to provide multiple types of input to communicate with the computing system 1900. The communications interface 1940 can govern and manage the user input and system output. There may be no restriction on operating on any particular hardware arrangement and therefore the basic features here may easily be substituted for improved hardware or firmware arrangements as they are developed.

The storage device 1930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1930 can include the software SVCs 1932, 1934, 1936 for controlling the processor 1910. Other hardware or software modules are contemplated. The storage device 1930 can be connected to the system bus 1905. In some embodiments, a hardware module that performs a particular function can include a software component stored in a computer-readable medium in connection with the necessary hardware components, such as the processor 1910, bus 1905, output device 1935, and so forth, to carry out the function.

FIG. 19B illustrates an example architecture for a chipset computing system 1950 that can be used in accordance with an embodiment. The computing system 1950 can include a processor 1955, representative of any number of physically and/or logically distinct resources capable of executing software, firmware, and hardware configured to perform identified computations. The processor 1955 can communicate with a chipset 1960 that can control input to and output from the processor 1955. In this example, the chipset 1960 can output information to an output device 1965, such as a display, and can read and write information to storage device 1970, which can include magnetic media, solid state media, and other suitable storage media. The chipset 1960 can also read data from and write data to RAM 1975. A bridge 1980 for interfacing with a variety of user interface components 1985 can be provided for interfacing with the chipset 1960. The user interface components 1985 can include a keyboard, a microphone, touch detection and processing circuitry, a pointing device, such as a mouse, and so on. Inputs to the computing system 1950 can come from any of a variety of sources, machine generated and/or human generated.

The chipset 1960 can also interface with one or more communication interfaces 1990 that can have different physical interfaces. The communication interfaces 1990 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1955 analyzing data stored in the storage device 1970 or the RAM 1975. Further, the computing system 1950 can receive inputs from a user via the user interface components 1985 and execute appropriate functions, such as browsing functions by interpreting these inputs using the processor 1955.

It will be appreciated that computing systems 1900 and 1950 can have more than one processor 1910 and 1955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

What we claim:

1. A non-transitory computer readable medium comprising computer executable instructions that, when executed by a processor, cause the processor to:
   access a bottomhole proppant concentration data channel comprising a series of bottomhole proppant concentration values for a stage being hydraulically fractured;
   normalize the bottomhole proppant concentration data channel to yield a normalized bottomhole proppant concentration data channel;
   quantize the normalized bottomhole proppant concentration data channel to yield a quantized bottomhole proppant concentration data channel and to generate a proppant ramp data channel denoting at least one time period encompassing at least one proppant ramp where the quantized bottomhole proppant concentration data channel meets a first threshold value, the at least one time period representing the at least one proppant ramp;
   generate a slurry volume data channel from a slurry rate data channel temporally aligned with at least a portion of the bottomhole proppant concentration data channel, the slurry volume data channel providing a cumulative slurry volume data over time;
   for a time preceding a first one of the at least one time period representing the at least one proppant ramp, identifying when a slurry volume resides in a range and a maximum bottomhole proppant concentration is at least a specific value to identify an acid pulse; and
   identify a hydraulic fracturing event based on when the slurry volume resides in the range and the maximum bottomhole proppant concentration is at least the specific value.

2. The non-transitory computer readable medium of claim 1, the computer executable instructions further causing the processor to:
   delete any denoted at least one time period representing the at least one proppant ramp when the at least one time period does not meet a second threshold value; and
   generate information from the proppant ramp data channel.

3. A method of identifying hydraulic fracturing events from time-series data comprising:
   accessing, with a processor, a bottomhole proppant concentration data channel comprising a series of bottomhole proppant concentration values for a stage being hydraulically fractured;
   normalizing the bottomhole proppant concentration data channel to yield a normalized bottomhole proppant concentration data channel;
   quantizing the normalized bottomhole proppant concentration data channel to yield a quantized bottomhole proppant concentration data channel and to generate a proppant ramp data channel denoting at least one time period encompassing at least one proppant ramp where the quantized bottomhole proppant concentration data channel meets a first threshold value, the at least one time period representing the at least one proppant ramp;
   generating a slurry volume data channel from a slurry rate data channel temporally aligned with at least a portion of the bottomhole proppant concentration data channel, the slurry volume data channel providing a cumulative slurry volume data over time; and
   identify a hydraulic fracturing event based on the slurry volume data channel and the proppant ramp data channel.

4. The method of claim 3 wherein the first threshold value is greater than zero.

5. The method of claim 3 further comprising deleting any denoted at least one time period representing the at least one proppant ramp when the at least one time period does not meet a second threshold value.

6. The method of claim 5 wherein the second threshold value is 600 seconds.

7. The method of claim 3 further comprising combining the proppant ramp data channel with at least one additional data channel for the stage being hydraulically fractured, and generating information from the proppant ramp data channel and the at least one additional data channel for the at least one proppant ramp.

8. The method of claim 3 further comprising:
   identifying a first one of the at least one time period representing the at least one proppant ramp; and
   identifying a time of a beginning of the first one of the at least one time period representing the at least one proppant ramp.

9. The method of claim 8, further comprising, for a time preceding the first one of the at least one time period representing the at least one proppant ramp, identifying when a slurry volume resides in a range and a maximum bottomhole proppant concentration is at least a specific value to identify an acid pulse.

10. The method of claim 9 further comprising identifying the acid pulse based on a highest value of the highest bottomhole proppant concentration.

11. A non-transitory computer readable medium comprising computer executable instructions that, when executed by a processor, cause the processor to perform:

receive hydraulic fracturing data comprising at least one data channel for at least one stage of a hydraulic fracturing sequence, the hydraulic fracturing data being a slurry rate for a stage being hydraulically fractured;

preprocess the at least one data channel to yield preprocessed hydraulic fracturing data;

generate one or more additional data channels based on the preprocessed hydraulic fracturing data, the one or more additional data channels being a slurry volume data channel for the stage being hydraulically fractured; and generate the slurry volume data channel from a slurry rate data channel temporally aligned with at least a portion of a bottomhole proppant concentration data channel, the slurry volume data channel providing a cumulative slurry volume data over time; and identify a hydraulic fracturing event based on the hydraulic fracturing data and the one or more additional data channels, the hydraulic fracturing event being a target slurry rate.

12. The non-transitory computer readable medium of claim 11, the computer executable instructions further the processor to:

apply a transform function to an interpolated slurry rate signal based on the slurry rate and the slurry volume data channel, the transform function identifying a peak that correlates with a time when the target slurry rate is reached.

13. The non-transitory computer readable medium of claim 11, the computer executable instructions further cause the processor to:

generate a cumulative proppant data channel and a bottomhole cumulative proppant data channel; and generate a cross correlation and identify a peak of the cross correlation, a volume corresponding to the peak being identified as a flush volume.

* * * * *